United States Patent [19]

Citron

[11] Patent Number: 4,697,561
[45] Date of Patent: Oct. 6, 1987

[54] ON-LINE ENGINE TORQUE AND TORQUE FLUCTUATION MEASUREMENT FOR ENGINE CONTROL UTILIZING CRANKSHAFT SPEED FLUCTUATIONS

[75] Inventor: Stephen J. Citron, W. Lafayette, Ind.

[73] Assignee: Purdue Research Foundation, West Lafayette, Ind.

[21] Appl. No.: 723,449

[22] Filed: Apr. 15, 1985

[51] Int. Cl.$^4$ .............................................. F02M 3/07
[52] U.S. Cl. .................... 123/339; 123/436; 364/431.07
[58] Field of Search ...................... 123/339, 419, 436; 364/431.05, 431.07

[56] References Cited

U.S. PATENT DOCUMENTS

| | | | |
|---|---|---|---|
| 4,009,699 | 3/1977 | Hetzler et al. | 364/511 |
| 4,015,466 | 4/1977 | Stick et al. | 73/116 |
| 4,015,467 | 4/1977 | Armstrong | 73/116 |
| 4,044,234 | 8/1977 | Frobenius et al. | 364/431.08 |
| 4,055,998 | 11/1977 | Pettingell et al. | 364/550 |
| 4,168,682 | 9/1979 | Gartner et al. | 123/416 |
| 4,197,767 | 4/1980 | Leung | 364/569 |
| 4,267,810 | 5/1981 | Wesemeyer et al. | 123/414 |
| 4,271,469 | 6/1981 | Kawai et al. | 364/431.12 |
| 4,277,830 | 7/1981 | Reid et al. | 364/511 |
| 4,292,670 | 9/1981 | Reid et al. | 364/551 |
| 4,325,128 | 4/1982 | Abnett et al. | 364/511 |
| 4,357,662 | 11/1982 | Schira et al. | 364/431.08 |
| 4,434,770 | 3/1984 | Nishimura et al. | 123/476 |
| 4,509,484 | 4/1985 | Gertiser | 123/436 |
| 4,532,592 | 7/1985 | Citron et al. | 123/339 X |

FOREIGN PATENT DOCUMENTS

0113510 7/1984 European Pat. Off. .
2952073 6/1981 Fed. Rep. of Germany .

OTHER PUBLICATIONS

W. Mihelc & S. Citron, "An On-Line Engine Roughness Measurement Technique", SAE Paper No. 840136 (Feb. 1984).
W. Mihelc and S. Citron, "An Adaptive Idle Mode Control System," SAE Paper No. 840443, (Feb. 1984).
"An Engine Sensor Update", Automotive Engineering, pp. 52–59, (Aug. 1982).
Anonymous, "Adaptive Balance Control for Injection System," 18002, 244 Research Disclosure No. 180 (1979-04).

Primary Examiner—Tony M. Argenbright
Attorney, Agent, or Firm—Barnes & Thornburg

[57] ABSTRACT

Techniques are provided for determining on-line measures of both the average torque produced by an internal combustion engine, and the torque fluctuations (relative combustion efficiencies) of the cylinders of a multiple cylinder internal combustion engine. These techniques employ knowledge of crankshaft speed at the points of fastest and slowest crankshaft speed. Also, an engine-performance monitor is proposed for determining the above noted quantities on-line. The engine-performance monitor permits monitoring of engine performance to test control strategies for both engine fuel distribution systems and ignition systems. The techniques and engine-performance monitor can also be incorporated into a feedback system for controlling the performances of the various individual cylinders of a multiple cylinder internal combustion engine. Engine crankshaft speed is the basis for the calculations required. An on-line determination of engine torque can be incorporated into an engine control system or used for diagnostic purposes. One control system makes use of a measure of the cylinder-by-cylinder and combustion event-by-combustion event contributions to engine torque to optimize ignition or injection timing on a cylinder-by-cylinder basis.

4 Claims, 29 Drawing Figures

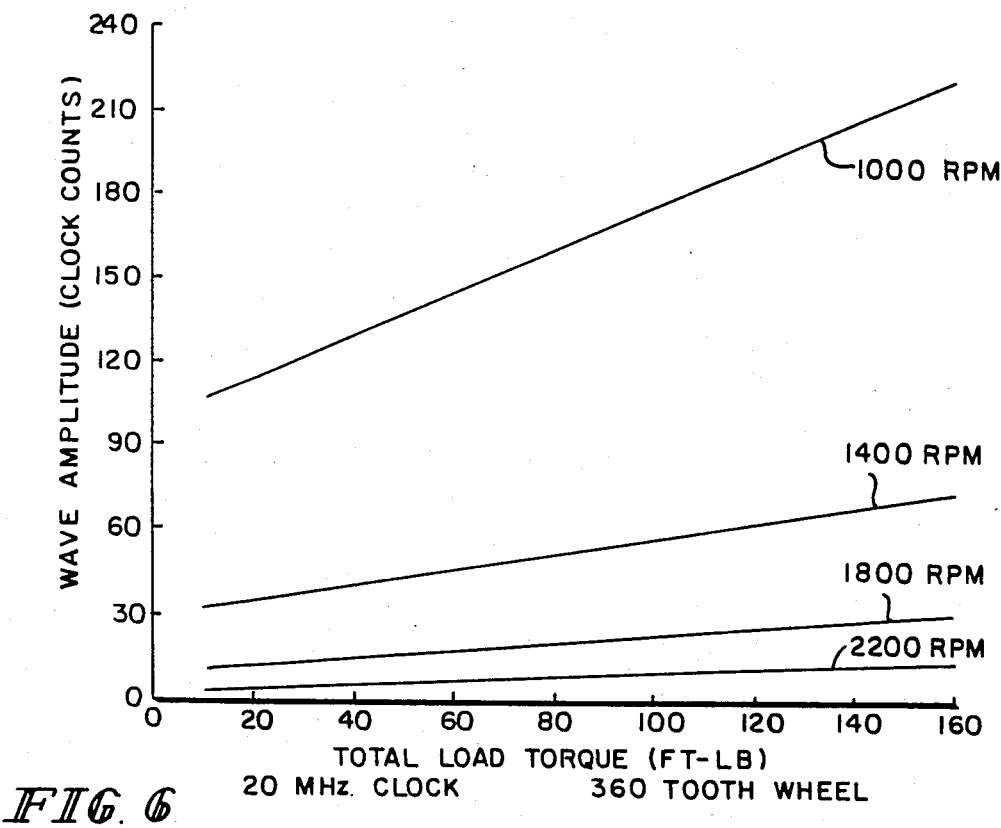
FIG. 6  20 MHz. CLOCK  360 TOOTH WHEEL
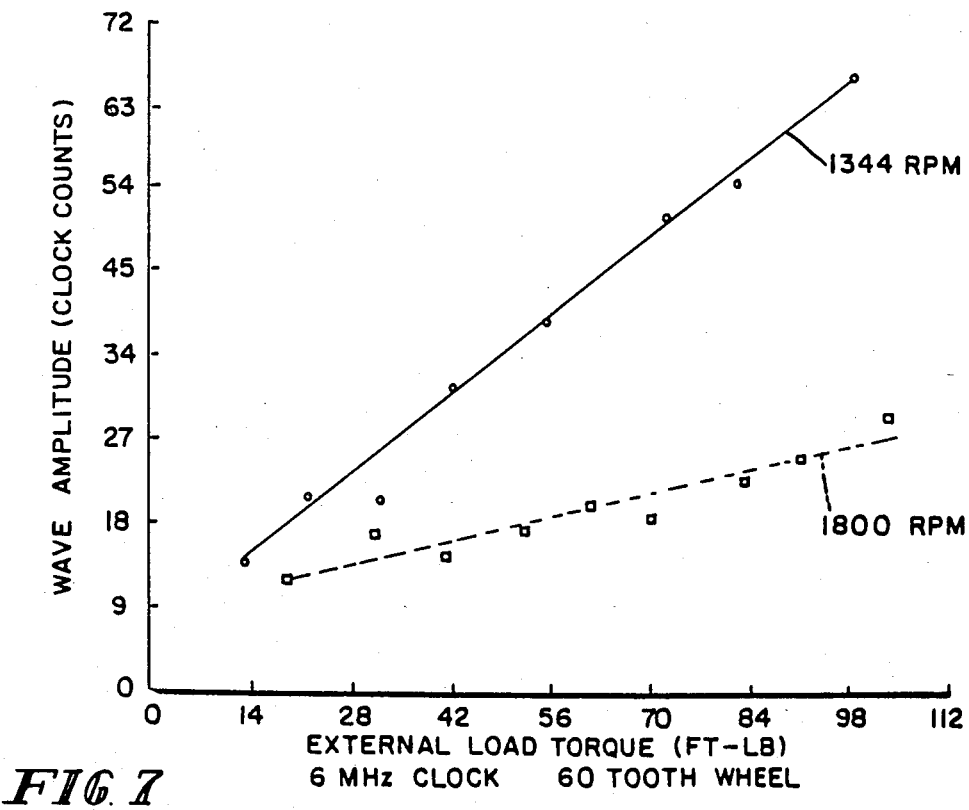
FIG. 7  6 MHz CLOCK  60 TOOTH WHEEL

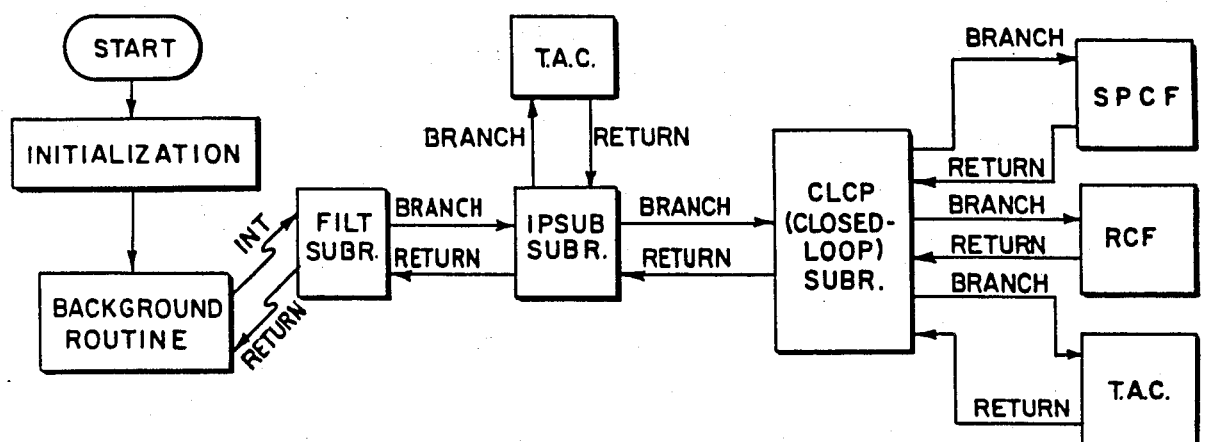
FIG. 16
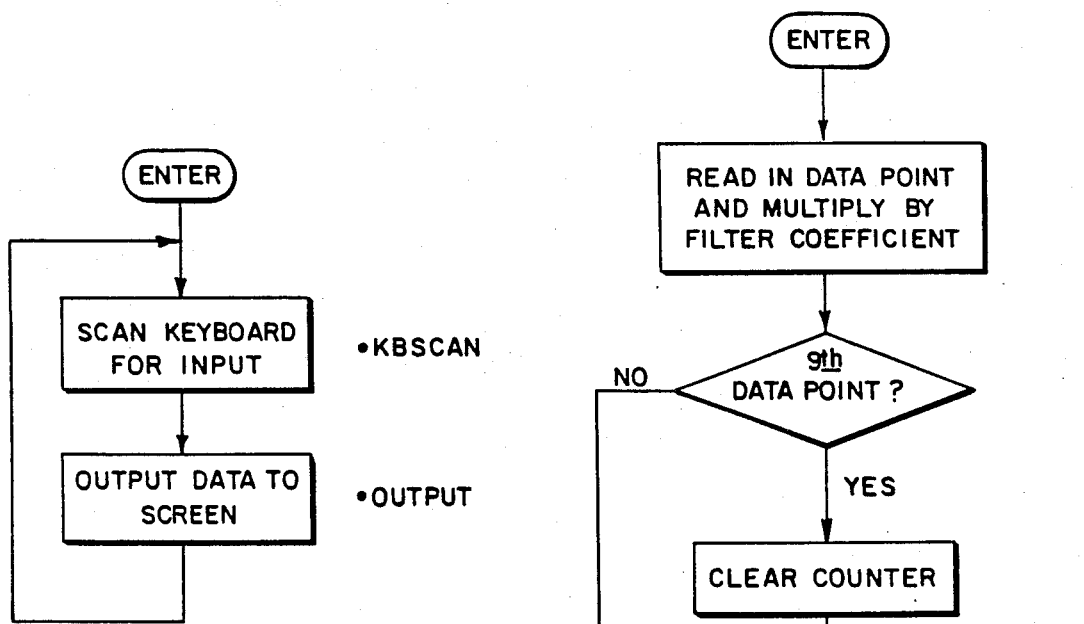
FIG. 17m
FIG. 17b
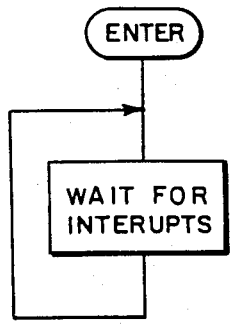
FIG. 17a

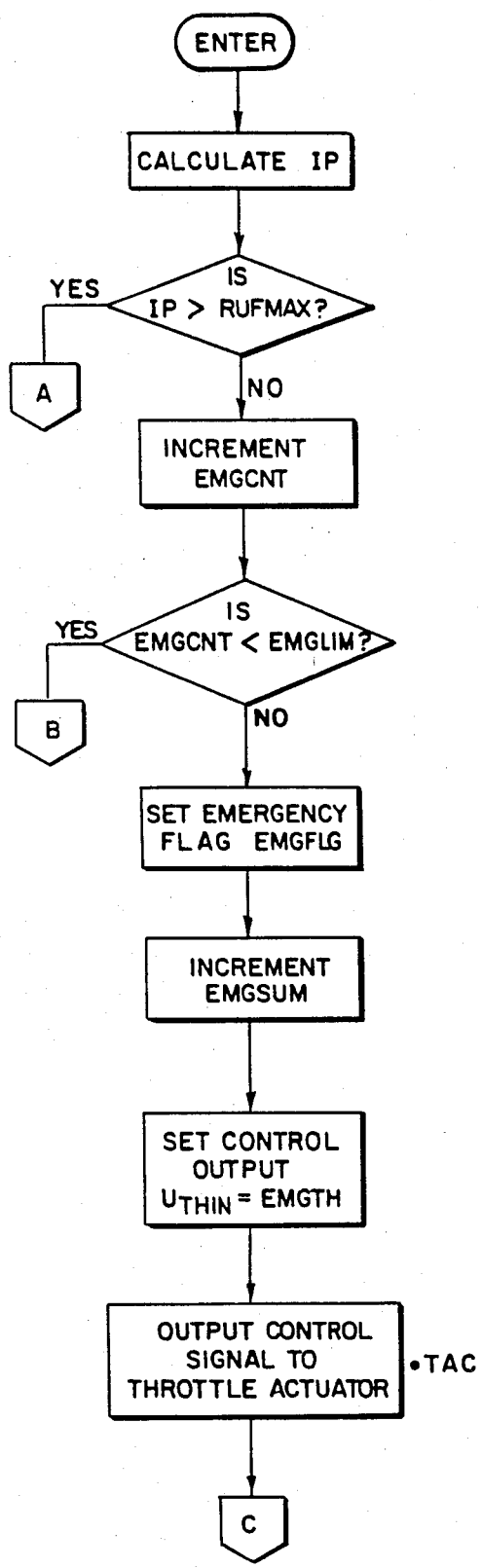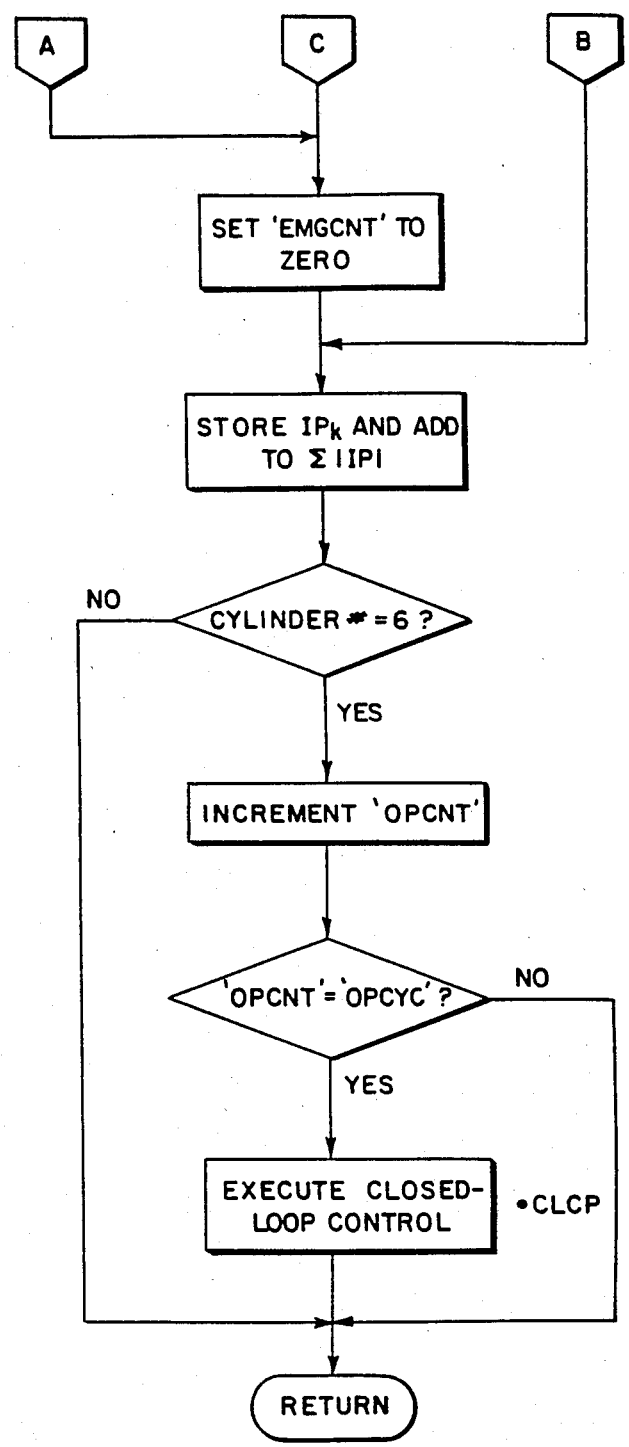
FIG. 17c
FIG. 17d

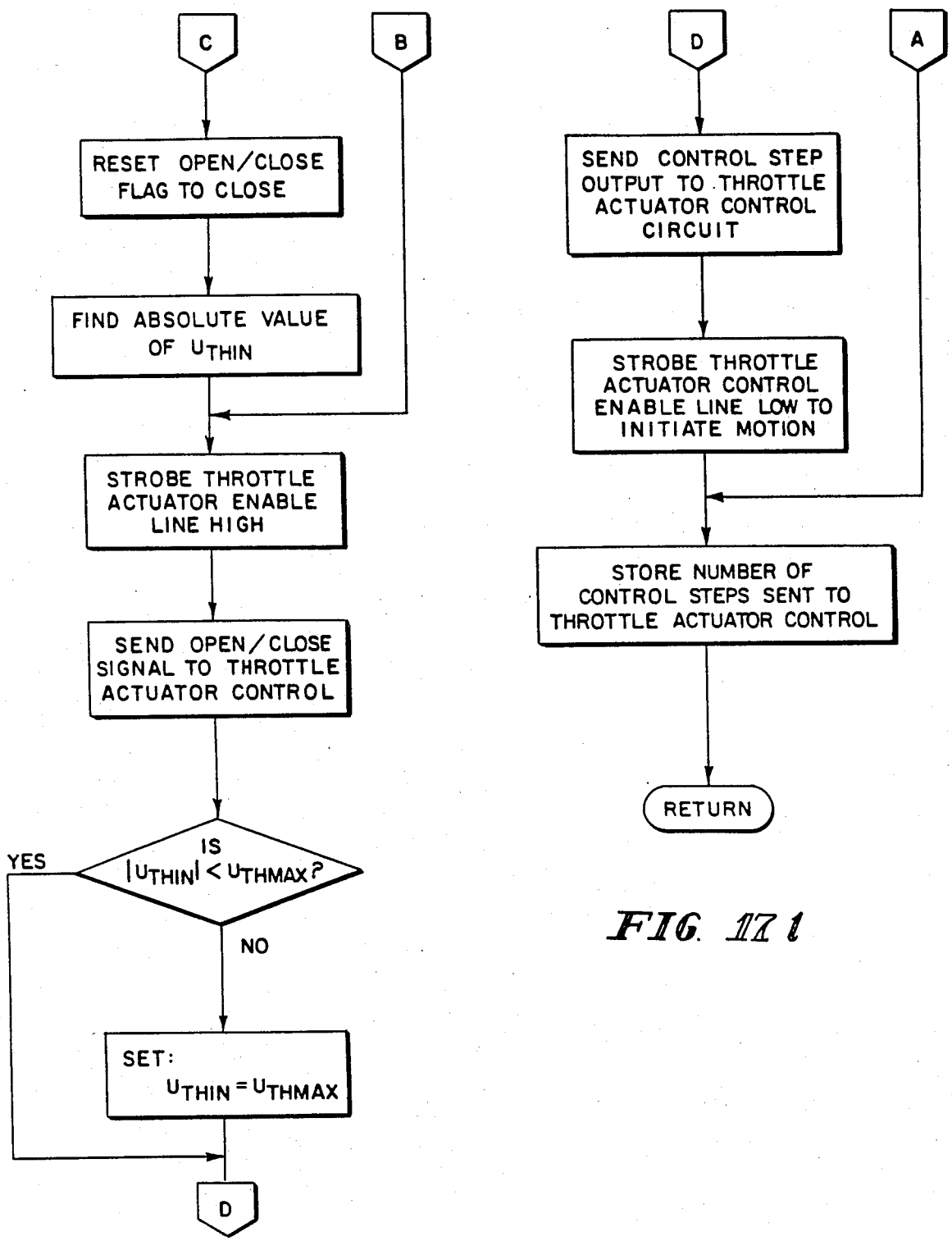

ON-LINE ENGINE TORQUE AND TORQUE FLUCTUATION MEASUREMENT FOR ENGINE CONTROL UTILIZING CRANKSHAFT SPEED FLUCTUATIONS

This invention relates to a technique for determining on-line measures of the average load torque acting on an internal combustion engine, the cylinder-by-cylinder torque production, and the fluctuation in torque production of each cylinder about the mean engine torque (relative combustion efficiency measure). This invention also relates to systems and techniques for monitoring the performances of the various cylinders of a multiple cylinder internal combustion engine. Additionally, this invention relates to feedback systems utilizing such systems and techniques not only to monitor, but also to control, the overall performance of a multiple cylinder internal combustion engine, as well as the individual performances of the engine's various cylinders.

On-line knowledge of torque output is valuable for both engine diagnostic and control applications. Consistently low torque output of a given cylinder, for example, may be an indication of a defective component, such as a defective spark plug or fuel injector, or of improper system operation such as valve fouling. Further, a measure of the torque production of the cylinders, both individually and collectively, can be used to increase the overall efficiency of the engine by optimizing certain control settings, such as ignition or injection timing, both collectively and on a cylinder-by-cylinder basis.

Techniques and systems for monitoring the performances, combustion efficiencies, compression balances, and the like of the various cylinders of multiple cylinder internal combustion engines are known. There are, for example, the systems and techniques disclosed in the following U.S. Pat. Nos.: 4,292,670; 4,277,830; 4,197,767; 4,055,998; 4,015,467; and 4,015,466. Different techniques and systems have been used to determine the individual performances of the various cylinders of a multiple cylinder internal combustion engine. These different techniques involve, and demonstrate the viability of, different strategies and philosophies in the operation and control of multiple cylinder internal combustion engines.

The applicability of the torque measure to internal combustion engine control stategies is broad. For example, in a spark ignition internal combustion engine, the spark advance is determined based primarily upon two parameters, engine speed and engine load. A commonly used measure of engine load is intake manifold vacuum. However, engine load is only reflected to a degree in the intake manifold vacuum. intake manifold vacuum is chosen in a typical control strategy because sensors are available which sense it, and a considerable history of spark advance control based upon intake manifold vacuum has been developed. However, there is not a perfect correlation between intake manifold vacuum and engine load. For example, intake manifold vacuum is subject to variations due to other causes than load changes. Additionally, the transducers which develop intake manifold vacuum-related signals must be insulated somewhat from engine conditions, resulting in intake manifold vacuum transducers which have relatively slow response times.

Accordingly, it is an object of the present invention to provide a spark advance control strategy and a spark advance control system which are responsive to signals that more accurately reflect engine load than the currently-used intake manifold vacuum-related signals.

According to one aspect of the invention, a technique for determining a measure of the engine torque produced utilizes data associated with the points of slowest and fastest speed of the crankshaft during the firing interval of a particular cylinder. This measure of the cylinder torque produced can then be used to provide a base level of control for a control parameter, such as spark advance in a spark ignited engine or fuel injection timing in a compression ignited engine.

The torque fluctuation or relative combustion efficiency measure of a cylinder is a measure of the torque (or work) produced by that cylinder relative to the mean torque (or work) level of all the cylinders of the engine. Knowledge of the amount of cylinder-to-cylinder variation in the combustion efficiency is valuable for both engine diagnostic applications and engine control applications. Consistently low combustion efficiency of a given cylinder, for example, may be an indication of a defective component (a spark plug or a fuel injector, for example). The combustion efficiency outputs of the individual cylinders measured over a period of time may serve as a means for evaluating the effectiveness of the air/fuel delivery system in uniformly distributing the air and fuel among the cylinders. Further, a measure of the relative combustion efficiency of the various cylinders can be beneficial in increasing the overall efficiency of the engine by optimizing control settings such as, for example, ignition or injection timing, on a cylinder-by-cylinder basis.

Thus, according to another aspect of the invention, data collected for successive cylinders at their points of slowest speed provides a measure of the fluctuation of torque production of each cylinder about the mean engine torque (relative combustion efficiency measure). That is, these data for successive cylinders at their points of slowest speed provide a technique for determining the relative combustion efficiencies of the various cylinders in a multiple cylinder internal combustion engine. Another measure of the fluctuation of torque production of each cylinder about the mean engine torque, but one using the crankshaft speed about TDC instead, is the subject of U.S. patent application Ser. No. 452,372, filed Dec. 22, 1982, now U.S. Pat. No. 4,532,592, and assigned to the same assignee as the present invention.

To achieve both of these primary objects in an illustrative embodiment, an electronic circuit is used in conjunction with a pair of magnetic pick-ups and multitooth wheels mounted on the engine to measure the elapsed time for successive known angular rotations of the crankshaft and to reference these times to a position, such as top dead center (TDC) of the power stroke of each cylinder in the combustion cycle. This data is input to a general purpose microprocessor which processes the data and calculates a measure of torque production for each cylinder, a measure of overall engine torque production, and a measure of the fluctuation of torque production of each cylinder about the mean engine torque (relative combustion efficiency measure).

Specifically, means are provided for sensing the position of the engine crankshaft. A clock generates a time base. An interval timer compares the output of the clock to the output of the position-sensing means to generate a crankshaft speed-related signal. Means are provided for coupling the crankshaft position-sensing means and clock to the interval timer. A data processor is provided, as are means for coupling the interval timer to the data processor to obtain measures of crankshaft speed at the points of slowest and fastest crankshaft speed during a firing interval of a cylinder.

According to the aspects of the invention which relate to setting both the base level of the control parameters and the fluctuation in their levels required to optimize the performance of individual cylinders, a system for controlling the performance of a multiple cylinder spark ignited internal combustion engine comprises an engine ignition generator and spark distribution system, means for coupling the ignition generator and spark distribution system to the various cylinders of the engine, means for sensing engine crankshaft position, and a clock for generating a time base. Means are provided for calculating crankshaft speed at the points of slowest and fastest crankshaft speed and means for coupling the clock and the crankshaft position sensor to the crankshaft speed calculator. Further means are provided for calculating the torque measure and the torque fluctuation measure (relative combustion efficiencies) of the various cylinders. These calculating means are coupled to the clock, the crankshaft position sensor, and the means for sensing the top dead center. Means are provided for calculating the ignition timing of the various cylinders to optimize, within an acceptable margin of error, the performance of the various cylinders. The calculating means are coupled to the ignition timing calculator and the ignition timing calculator is coupled to the ignition generator and spark distribution system to control it.

According to an illustrative embodiment, the calculating means comprises a data processor for utilizing the signals from the time base generator and the crankshaft position sensor to provide a set of data points centered about the points of slowest and fastest crankshaft speed during a firing interval of the cylinder.

Further according to the aspects of the invention which relate both to setting the base level of the control parameters and to setting the fluctuation in their levels required to optimize the performance of individual cylinders of a multiple cylinder compression ignited internal combustion engine, an illustrative embodiment comprises an engine fuel distribution system, means for coupling the fuel distribution system to the various cylinders, means for sensing the engine crankshaft position, and a clock for generating a time base. This system further includes means for calculating crankshaft speed at the points of slowest and fastest crankshaft speed, and means for coupling the clock and the crankshaft position sensor to the crankshaft speed calculator. Further means are provided for calculating the torque measure and the torque fluctuation measure (relative combustion efficiencies) of the various cylinders. These calculating means are coupled to the clock, the crankshaft position sensor, and the means for sensing top dead center. Means are provided for calculating a fuel distribution parameter of the various cylinders to optimize, within an acceptable margin of error, the performance of the various cylinders. The calculating means are coupled to the means for calculating a fuel distribution parameter and the means for calculating the fuel distribution parameter are coupled to the engine fuel distribution system to control it.

According to an illustrative embodiment, the fuel distribution parameter is the amount of fuel which is to be metered into each respective cylinder.

According to another illustrative embodiment, the fuel distribution parameter is the time in the respective cylinder's operating cycle at which the fuel is metered into the cylinder.

The invention may best be understood by referring to the following description and accompanying drawings which illustrate the invention. In the drawings:

FIG. 6 illustrates a graph of count wave amplitude versus load torque for a simulated engine;

FIG. 7 illustrates a graph of count wave amplitude versus load torque for an actual engine;

FIG. 16 is a program flow chart for a system constructed according to one aspect of the present invention; and FIGS. 17a-17m are more detailed flow charts of portions of the program flow chart of FIG. 16.

TORQUE MEASURE ACQUISITION

Figure 1:
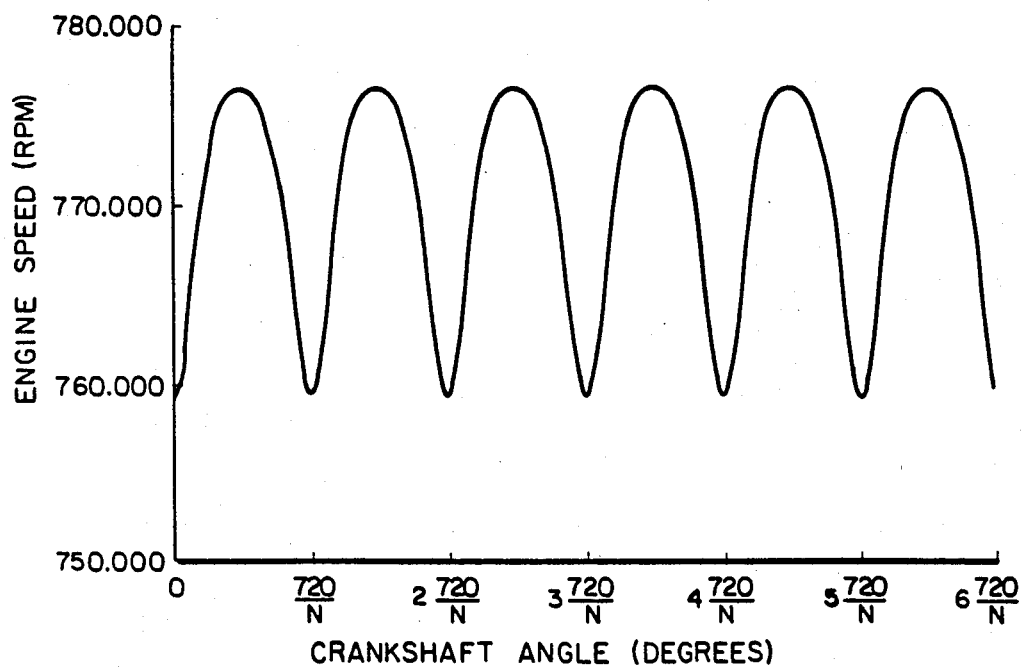
FIG. 1 illustrates a graph of engine speed versus crank angle for an ideal engine.

In the analysis that follows, particular symbols will be used to represent particular variables. The following is a table of those symbols and the variables they represent.

TABLE OF SYMBOLS AND CORRESPONDING VARIABLES

| | |
|---|---|
| $A$ | Speed fluctuation amplitudes for all cylinders averaged over one engine cycle |
| $\overline{A}$ | Speed fluctuation amplitudes for all cylinders averaged over a number of engine cycles |
| $A_j$ | Speed fluctuation amplitude for the single cylinder with power stroke occurring during the j'th firing interval |

-continued

TABLE OF SYMBOLS AND CORRESPONDING VARIABLES

| | |
|---|---|
| $\overline{A_j}$ | Speed fluctuation amplitude for the single cylinder with power stroke occurring during the j'th firing interval averaged over a number of firings of that cylinder |
| $C_i$ | Unfiltered count value corresponding to the i'th data point |
| $\hat{C}_i$ | Filtered count value corresponding to the i'th data point |
| $CA_j$ | Filtered count fluctuation amplitude in the j'th firing interval |
| $\overline{CA_j}$ | Filtered count fluctuation amplitude for the cylinder undergoing its power stroke during the j'th firing interval averaged over a number of firings of that cylinder |
| $CA$ | Filtered count fluctuation amplitude averaged over all cylinders during one engine cycle |
| $\overline{CA}$ | Filtered count fluctuation amplitude averaged over all cylinders and a number of engine cycles |
| $f_{CLK}$ | Frequency of the clock used on the DIT to determine the time for successive teeth to pass the magnetic pick-up |
| $J$ | Engine-drive line rotary inertia |
| $N$ | Number of cylinders in the engine |
| $Q_{1j}$ | Unfiltered count value corresponding to the point of slowest speed in the j'th firing interval |
| $\hat{Q}_{1j}$ | Filtered count value corresponding to the point of slowest speed in the j'th firing interval |
| $Q_{2j}$ | Unfiltered count value corresponding to the point of fastest speed in the j'th firing interval |
| $\hat{Q}_{2j}$ | Filtered count value corresponding to the point of fastest speed in the j'th firing interval |
| $\hat{Q}_j$ | Filtered count value corresponding to the mean of the count values in the j'th firing interval |
| $S$ | Crankshaft speed |
| $S_i$ | Mean engine speed over the i'th time interval for a tooth on the crankshaft multi-tooth wheel to rotate $\Delta\theta$ degrees |
| $S_{fj}$ | Fastest crankshaft speed occurring in the j'th firing interval |
| $S_{sj}$ | Slowest crankshaft speed occurring in the j'th firing interval |
| $T_i$ | The i'th time interval during which the crankshaft multi-tooth wheel rotates a $\Delta\theta$ degrees |
| $T_{Ej}(t)$ | Torque produced by the j'th cylinder at time t |
| $T_{Ej}$ | Average torque produced during the engine cycle by the single cylinder with power stroke occurring during the j'th firing interval, $(t_{Fj})$ |
| $\overline{T_{Ej}}$ | The quantity $T_{Ej}$ averaged over a number of firings of the single cylinder with power stroke occurring during the j'th firing interval, $(t_{Fj})$ |
| $T_E(t)$ | Engine torque produced by all the cylinders at time t |
| $T_E$ | Average engine torque produced by all N cylinders over one engine cycle |
| $\overline{T_E}$ | The quantity $T_E$ averaged over a number of engine cycles |
| $T_L$ | Engine load torque |
| $t_F$ | Time between successive TDC (firing interval) |
| $\Delta\theta$ | Fixed angular rotation over which the counts are measured. Corresponds to the tooth spacing on the crankshaft multi-tooth wheel. |

Figure 2:
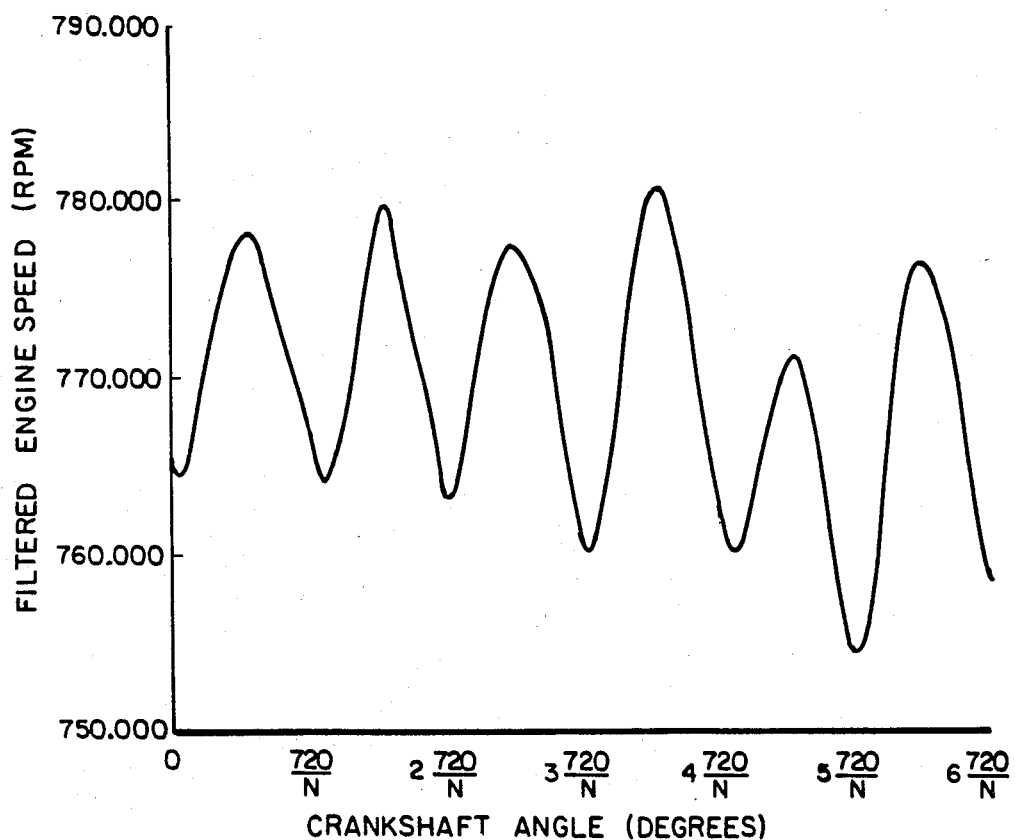
FIG. 2 illustrates a graph of filtered actual engine speed versus crank angle for an actual engine.

In an engine operating at steady state, the mean engine speed is constant. The instantaneous engine speed, however, undergoes cyclic variations about the means speed as a result of the cyclic energy imparted to the crankshaft during the power stroke of each cylinder. In an ideal engine, all of the cylinders would behave identically and produce the same amount of torque. In this case, the cyclic speed variations are regular as shown in FIG. 1 and repeat every 720/N degrees for a 4-stroke, N cylinder engine. In an actual engine, the cylinders do not all produce the same amount of torque and the speed variations are irregular. A plot of filtered instantaneous engine speed versus crankshaft angle taken from an actual engine on a test stand is shown in FIG. 2. The information contained on this speed plot can be used to determine the torque production levels both of the individual cylinders and of the overall engine.

At any instant in time, the net engine torque produced by the engine is the sum of the torque contributions of the individual cylinders. It can be shown, however, that over a specific portion of crankshaft rotation, the net torque can be suitably approximated by the torque produced in the one cylinder which is executing its power stroke during that specific portion of crankshaft rotation. That is, over this portion of crankshaft rotation, the contributions of the remaining N−1 cylinders may be considered negligible. Application of this concept to both simulation engine data and actual engine data has indicated that, for a determination of torque produced by the engine, the best results are obtained by using the angle of crankshaft rotation from the vicinity of TDC on the power stroke of one cylinder, where the crankshaft speed is slowest, to a point prior to the next TDC where the crankshaft speed is fastest. In other words, over this angle of the power stroke of a particular cylinder, the net engine torque can be quite accurately approximated by the torque produced by that cylinder.

Figure 3:
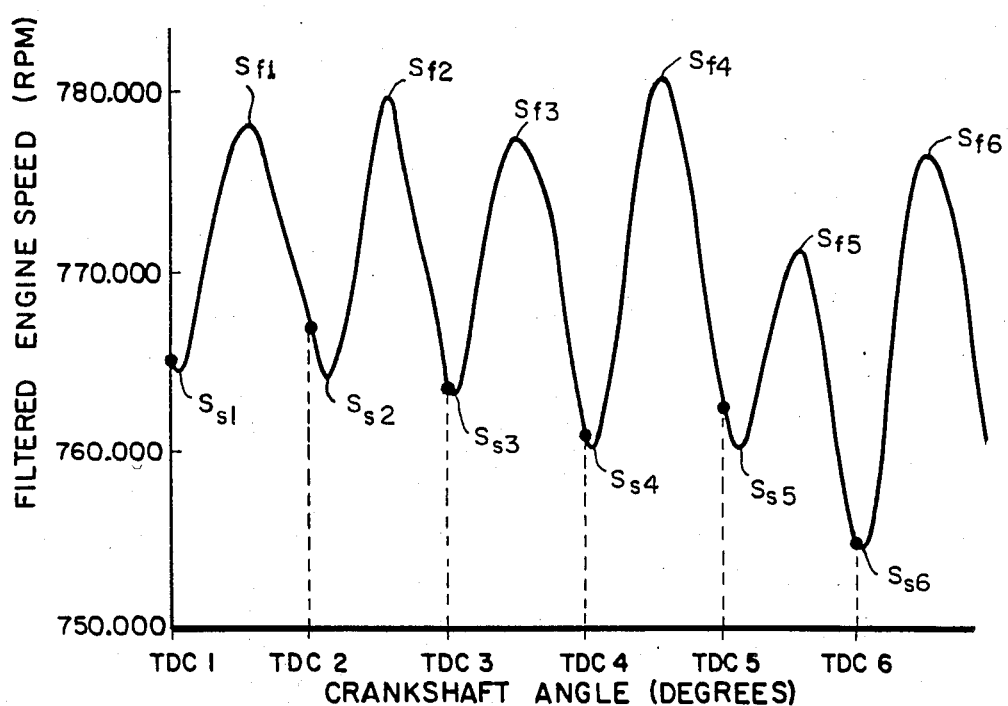
FIG. 3 illustrates a graph of instantaneous engine speed key points versus crankshaft angle for an actual engine.

Referring now to FIG. 3, the number one cylinder in the firing order reaches TDC prior to beginning the power stroke at the crankshaft angle indicated as "TDC 1." It should be understood that in the context of this invention, TDC refers to top dead center of the power stroke of a cylinder. The next cylinder in the firing order reaches TDC 720/N degrees later at "TDC 2." $S_{s1}$ denotes the slowest speed between the two TDC's and $S_{f1}$ the fastest speed. The difference between the instantaneous speeds at these two points is a measure of the net engine acceleration over the interval involved and defines the amplitude $A_l$ of the crankshaft speed fluctuation in this interval. So, $$A_j = S_{fj} - S_{sj} \tag{1}$$

where the index j refers to the interval (firing interval) between the j'th and the j+first TDC.

It is known that the time rate of change of the crankshaft angular velocity is equal to the net torque acting on the system divided by the system rotary inertia J. Thus $$\dot{S} \sim \frac{T_E(t) - T_L}{J} \tag{2}$$

where

| | |
|---|---|
| $T_{Ej}(t)$ | Engine torque produced by the j'th cylinder at time t |
| $T_{Ej}$ | Average torque produced during the engine cycle by the single cylinder with power stroke occurring during the j'th firing interval, $(t_{Fj})$ |
| $T_E(t)$ | Engine torque produced by all the cylinders at time t |
| $T_E$ | Average engine torque produced by all N cylinders over one engine cycle |
| $T_L$ | Engine load torque |
| $t_F$ | Time between successive TDCs, (firing interval) |

Integrating Equation 2 between the times of slowest and fastest speed following TDC j, $$S_{fj} - S_{sj} = A_j \sim S \int_{t=t_s}^{t=t_f} \frac{(T_E(t) - T_L)dt}{J} \tag{3}$$

Assuming steady state operation and using both analytical models and experimental results, the integral on the right hand side of Equation 3 has been found to vary directly with the load torque $T_L$ and the cylinder firing interval $t_f$, yielding $$A_j \sim \frac{T_L t_F}{J} \quad (4)$$

Equation 4 provides the means to determine the average over the j'th firing interval of the torque produced by the cylinder whose power stroke occurs in the interval. For steady state operation, that is, for the average engine speed to remain constant over successive firing intervals, the average load torque seen by each cylinder must equal the average engine torque produced over each firing interval. Since in the j'th firing interval the torque produced by the cylinder undergoing its power stroke is predominant, Equation 4 may be thought of as relating the speed fluctuation amplitude of a single cylinder to the average torque produced by that cylinder over the firing interval. Substituting $T_{Ej}$ for $T_L$ in Equation 4, $$A_j \sim \frac{T_{Ej} t_F}{J} \quad (5)$$

If all cylinder firings were equal, the quantity $A_j$, the amplitude of the crankshaft speed fluctuation associated with the j'th cylinder, would be the same for all cylinders and the speed waveform would be regular as in FIG. 1. As shown in FIG. 2, this is not the case in an actual engine. Thus, the quantity $A_j$ and Equation 5 may be associated with the engine torque produced by the j'th cylinder. To obtain a relation for the average torque produced by the engine over all the cylinders, the wave amplitudes can be averaged over the engine cycle. Thus, $$A = \frac{\sum_{j=1}^{j=N} A_j}{N} \sim \frac{T_E t_f}{J} \quad (6)$$

where $$T_E = \frac{\sum_{j=1}^{j=N} T_{Ej}}{N} \quad (7)$$

Equation 5 can be thought of as relating the speed fluctuation amplitude of a single cylinder to the average torque produced by that cylinder over the firing interval. Equation 6 provides a corresponding relation between the average speed fluctuation amplitude over one engine cycle and the average engine torque produced over the engine cycle. Solving for the average cylinder and engine torques during one cycle, $$T_{Ej} \sim \frac{A_j J}{t_F} \quad (8)$$

$$T_{Ej} \sim \frac{AJ}{t_F} \quad (9)$$

$T_{Ej}$ Average engine torque produced during the engine cycle by the single cylinder with power stroke occurring during the j'th firing interval, ($t_{Fj}$)

$T_E$ Average engine torque produced by all $N$ cylinders over one engine cycle

Combustion events in an engine are inherently unsteady. It is therefor desirable to obtain not only a measure of the average torque produced during a single cylinder firing or a single engine cycle, but also cylinder torque production averaged over a number of firings of the same cylinder and engine torque production averaged over a number of engine cycles. These quantities are denoted by bars over each of the dependent variables in Equations 8 and and 9. Thus $$\overline{T_{Ej}} \sim \frac{\overline{A_j} J}{t_F} \quad (10)$$

$$\overline{T_E} \sim \frac{\overline{A} J}{t_F} \quad (11)$$

where the barred quantities indicate averages over a number of cylinder firings and engine cycles.

In the technique according to the invention, the instantaneous engine speed data required to form the speed fluctuation amplitude, and through it the torque, is not obtained. Rather, an associated "count fluctuation amplitude" is derived by measuring the time intervals, $T_i$, for fixed angular rotations of the crankshaft to occur. The count fluctuation amplitude, CA, calculated in this manner supplies information comparable to that provided by the speed fluctuation amplitude, A, previously described. Calculation of the average torque for each cylinder is then achieved in four steps: (1) measurement of the crankshaft time intervals $T_i$; (2) on-line digital filtering of these measurements; (3) calculation of a count amplitude, CA, for each firing; and (4) averaging the count amplitude for each cylinder over successive firings. These steps are discussed in the following description.

The basis for calculating the cylinder torque is the crankshaft time interval data. A multi-tooth wheel attached to the engine crankshaft, a stationary magnetic pick-up, and a digital electronic circuit are used to count the cycles of a high frequency clock which occur during a fixed angular rotation of the crankshaft. The measured counts of the clock are directly proportional to the time required for the crankshaft to rotate through the known angle. The relations among the measured counts over the fixed angle of rotation, the time interval of the rotation, and the engine speed are $$C_i = f_{CLK} T_i \quad (12)$$

$$\overline{S_i} = \frac{\Delta\theta}{6T_i} \quad (13)$$

where $C_i$ is the measured counts of the high frequency clock, $f_{CLK}$ is the clock frequency in Hz, $T_i$ is the time interval, in seconds, for the crankshaft to rotate through $\Delta\theta$ degrees, $\overline{S_i}$ is the mean engine speed, in RPM, over the corresponding angle of rotation, and $\Delta\theta$ is the angle, in degrees, through which the crankshaft rotates. The subscript i refers to the i'th data point.

Eliminating the time interval $T_i$ between Equations 12 and 13, it is seen that the number of counts measured over a given angle of rotation is inversely proportional to the mean engine speed over this interval.

$$C_i = \frac{f_{CLK}\Delta\theta}{6} \frac{1}{\overline{S}_i} \qquad (14)$$

Thus, if the counts for successive known angular rotations are measured, and Equation 14 solved for $\overline{S}_i$ in terms of $C_i$, the curve of approximate instantaneous engine speed versus crankshaft angle can be reconstructed. For small values of $\Delta\theta$, this curve approaches the curve of instantaneous engine speed versus crankshaft angle shown in FIG. 2.

Figure 4:
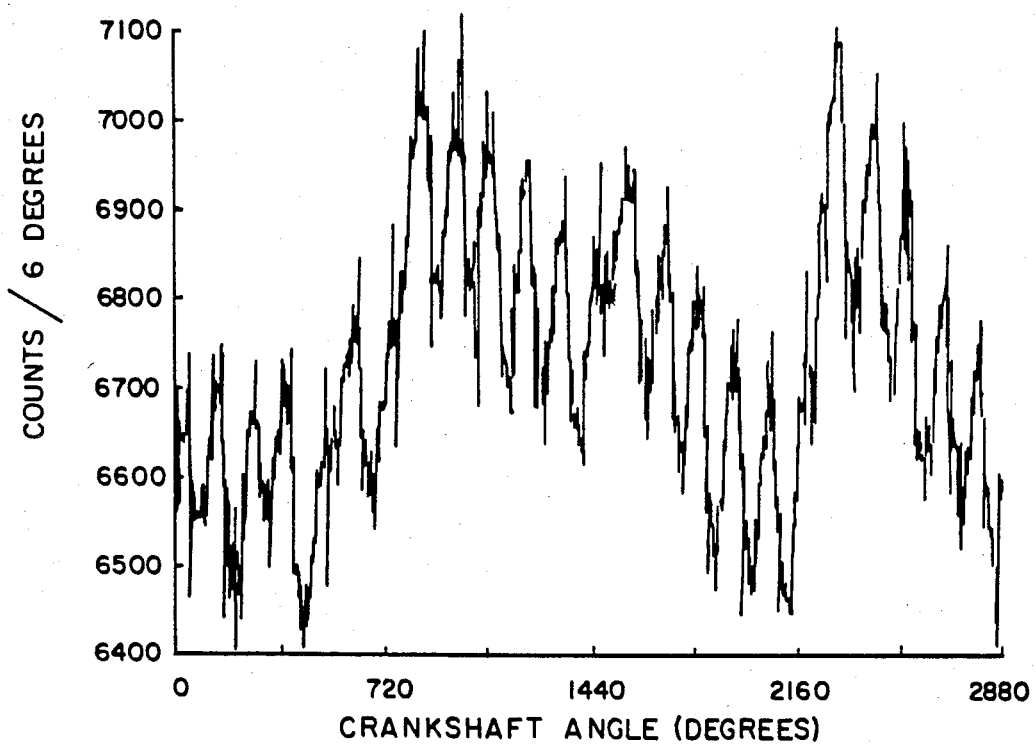
FIG. 4 illustrates a graph of measured counts for successive fixed angular rotations of the crankshaft of an actual engine.
Figure 5:
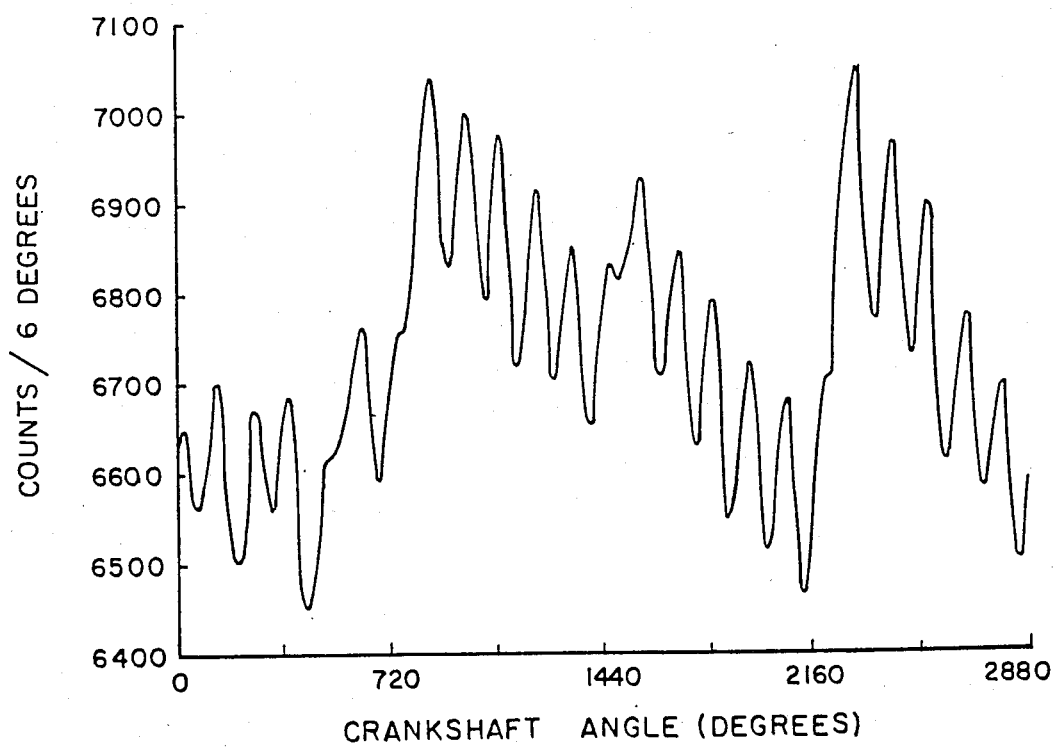
FIG. 5 illustrates, for the engine data of FIG. 4, a graph of filtered counts for successive fixed angular rotations of the crankshaft of an actual engine.

A plot of successive measured counts taken from an engine mounted on a test stand is shown in FIG. 4. For this case, $\Delta\theta$ is 6 degrees and $f_{CLK}$ is 6 MHz. The high frequency noise superimposed on the signal is the result of measurement errors, most notably slight variations in the successive $\Delta\theta$. These variations are a result of the inaccuracies of the tooth spacing on the multi-tooth wheel. Such errors can be reduced by using a higher precision wheel, but this adds to the overall cost of the system. Another means of reducing the noise is by filtering the data. The system described makes use of an on-line, non-recursive digital filtering technique to reduce the noise. FIG. 5 is a plot of the data from FIG. 4, but after filtering. The digital filter has successfully removed the noise, while the normal engine fluctuations still remain.

The method of determining the torque production level of each cylinder requires the instantaneous engine speed at only two points within the firing interval. Those two points are the points of slowest and fastest speeds. Thus, the complete speed versus crankshaft angle curve is not necessary. Likewise, to calculate the torque based on the count fluctuation amplitude, the complete curve is not needed.

Letting $C_i$ be the i'th unfiltered data point and $\hat{C}_i$ be the i'th filtered data point, the non-recursive filtering scheme uses nine unfiltered data points to calculate each filtered data point. The value of nine is suitable for the 60 toothed wheel used. The four unfiltered points on either side of the point of interest are used along with the unfiltered data point itself. Thus $$C_i = f(c_{i-4}, c_{i-3}, c_{i-2}, c_{i-1}, c_i, c_{i+1}, c_{i+2}, c_{i+3}, c_{i+4}) \qquad (15)$$

$Q_{1j}$ and $Q_{2j}$ are defined as the unfiltered count data associated with the points of slowest and fastest speeds in the interval between TDC j and TDC j+1. $\hat{Q}_{1j}$ and $\hat{Q}_{2j}$ are defined as the corresponding filtered values. From Equation 14 it can be seen that the quantities $\hat{Q}_{1j}$ and $\hat{Q}_{2j}$ are inversely related to speed. They are numbered in the order that they occur after TDC during normal engine operation.

To calculate the cylinder torque given by Equation 8, the speed fluctuation amplitude $A_j$ must first be found. The filtered count values are used to determine speed. From Equation 1 and 14

$$A_j = S_{fj} - S_{sj} = \frac{f_{CLK}\Delta\theta}{9}\left[\frac{1}{\hat{Q}_{2j}} - \frac{1}{\hat{Q}_{1j}}\right] \qquad (16)$$

In the above relation, use has been made of the fact that for small $\Delta\theta$ the instantaneous engine speed is reasonably approximated by the mean speed $\overline{S}$ over the interval $\Delta\theta$. Simplifying $$A_j = \frac{f_{CLK}\Delta\theta}{6\hat{Q}_{1j}\hat{Q}_{2j}} CA_j \qquad (17)$$

where the filtered count fluctuation amplitude in the j'th firing interval, $CA_j$, is given by $$CA_j = \hat{Q}_{1j} - \hat{Q}_{2j} \qquad (18)$$

Formally

| | |
|---|---|
| $CA_j$ | Filtered count fluctuation amplitude in the j'th firing interval |
| $\overline{CA_j}$ | Filtered count fluctuation amplitude for the cylinder undergoing its power stroke during the j'th firing interval averaged over a number of firings of that cylinder |
| $CA$ | Filtered count fluctuation amplitude averaged over all cylinders during one engine cycle |
| $\overline{CA}$ | Filtered count fluctuation amplitude averaged over all cylinders and a number of engine cycles |

Substituting into Equation 8 the cylinder torque measure is obtained.

$$T_{Ej} = J\frac{f_{CLK}\Delta\theta}{6\hat{Q}_{1j}\hat{Q}_{2j}} \frac{1}{t_F} CA_j \qquad (19)$$

Since the speed (or count) fluctuations about their mean values are at most on the order of only a few percent over the firing interval, the quantity $\hat{Q}_{1j}\hat{Q}_{2j}$ in Equation 19 can be replaced by $\hat{Q}^2$ with great accuracy. Further, since $\hat{Q}_j$ and $t_F$ are both inversely proportional to the mean engine speed over the firing interval, $$T_{Ej} \sim \overline{S}_j^3 CA_j \qquad (20)$$

At constant mean engine speed, the cylinder torque for a single firing is then given by $$T_{Ej} \sim CA_j \qquad (21)$$

while the overall engine torque from a single engine cycle is given by $$T_E \sim CA \qquad (22)$$

To overcome the randomness inherent in the torque production process, in some applications it is desirable to average these measures over an appropriate number of firings of the cylinder or engine cycles. The corresponding torque measures follow:

$$\overline{T}_{Ej} \sim \overline{CA_j} \qquad (23)$$

and $$\overline{T}_E \sim \overline{CA} \qquad (24)$$

The inventive torque measurement technique was applied both to data generated by a digital computer engine simulation model and to actual data taken from an engine on a test stand. In both cases, excellent correlation was found between the torque postulated and the simulation and test results.

In the simulation model, the instantaneous torque contribution of each cylinder was calculated at each integration step of the program. The instantaneous torque is composed of inertial and pressure components. Pressure torque calculations are based on a thermodynamic model in which the cylinder pressure is a function of both the change in cylinder volume and the heat added by the combustion process.

Simulation results are shown in FIG. 6 and test stand results in FIG. 7. No attempt was made to adjust the parameters of the simulation model to agree with those of the actual engine. The clock rates in the two cases were different. The test stand engine was a Chrysler slant 6 of 225 cubic inches displacement.

For both simulation and test stand results, the prediction of Equation 24 linearly relating the mean torque produced by the engine to the count wave amplitude is fully borne out. It should be remembered that at steady state the mean torque produced by the engine must equal the load torque seen by the engine.

Figure 8:
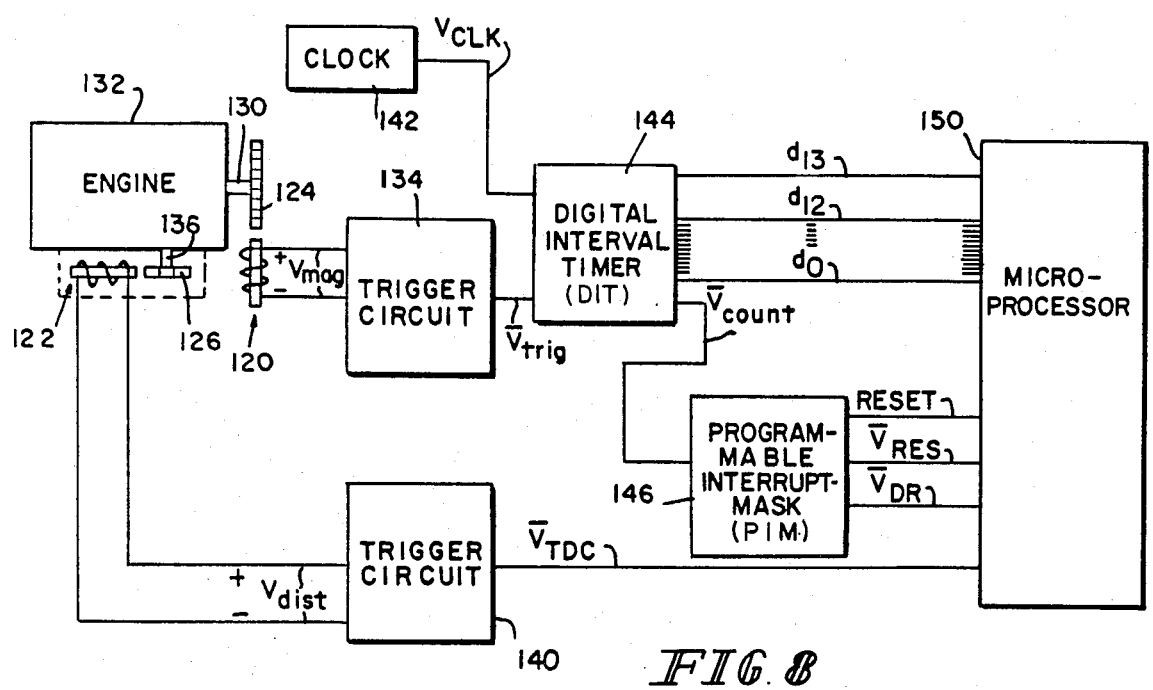
FIG. 8 is a block diagram of a system constructed according to the present invention for determining both the torque measures and the torque fluctuation measures (relative combustion efficiencies) of the cylinders of a multiple cylinder spark ignition internal combustion engine.

A schematic diagram of the system used to determine both cylinder and engine torque measures on an internal combustion engine is shown in FIG. 8. The diagram may be separated into three sections: (1) sensors; (2) electronic circuitry; and (3) a microprocessor.

The sensors comprise two magnetic pickups 120, 122 mounted in close proximity to two rotating multi-toothed wheels 124, 126. Wheel 124 is mounted to a crankshaft 130 of engine 132, and is used, in conjunction with associated magnetic pick-up 120 and trigger circuitry 134, to generate a signal at fixed angular rotations of the crankshaft. The second wheel 126 is mounted to a distributor shaft 136 of engine 132 in the case of a spark ignited engine (the terminology would change in the case of a compression ignited engine but the methodology would be the same). This second wheel 126, along with its associated magnetic pick-up 122 and trigger circuitry 140, is used to generate a reference to top dead center for each cylinder.

The electronic circuitry includes the two trigger circuits 134, 140, a clock pulse generation section 142 a digital interval timer (DIT) 144 and a programmable interrupt mask 146. This circuitry provides signal conditioning for the outputs of the magnetic pick-ups 120, 122, measures the elapsed time for successive fixed angular rotations of the crankshaft 130, and generates and transmits signals and data to a microprocessor 150.

Microprocessor 150 receives the data from the electronic circuitry. It then performs the filtering and calculations necessary to determine the individual cylinder and overall engine count wave amplitudes and, through them, the corresponding torque.

The operation of the system is basically as previously described in U.S. Ser. No. 452,372, which will be discussed in detail later. A significant difference between the operation of the present invention and the system disclosed in U.S. Ser. No. 452,372 is that the relative combustion efficiency measure sought in U.S. Ser. No. 452,372 required knowledge of the counts per degree of crankshaft rotation at top dead center, i.e., once in each firing interval. The torque measure, on the other hand, requires measures at the points of slowest and fastest speed. Thus, in the current case, toothcount data sufficient to filter two distinct points per firing interval must be treated by the microprocessor, rather than one. Another significant difference is that the system disclosed in U.S. Ser. No. 452,372 used crankshaft speed about successive TDCs to calculate an index of performance for each cylinder. The present invention uses crankshaft speed at the point of slowest rotation in successive firing intervals to calculate an index of performance for each cylinder.

Determination of the location of the points of slowest and fastest speed after TDC has been implemented by noting that, at any average speed, the point of slowest speed is a direct function of the ignition timing in the case of spark ignition engines and injection timing in the case of compression ignition engines. Thus, the point of slowest speed can be prestored in the microprocessor. Illustratively, the point of slowest speed for a particular type of engine would be experimentally determined by operating the engine on a test stand. The engine would be run at several speeds and, at each speed, under several different load conditions. The point of slowest speed would then be determined for each speed and load condition. These points of slowest speed would then be prestored in the microprocessor.

The corresponding point of fastest speed tends to occur with great regularity a fixed number of crankshaft degrees from the slowest speed point in the firing interval. Thus the point of fastest speed can also be determined from data prestored in the microprocessor. Illustratively, the number of crankshaft degrees at which the point of fastest speed occurs from the point of slowest speed would also be experimentally determined by running the engine on a test stand at various speeds and under various load conditions.

Alternative implementations utilizing on-line determinations of the speed (count) reference positions are also possible. As will be described in detail later, crankshaft speed at any given point is determined by counting the number of pulses of a fixed frequency clock which occur in the interval between the passage of two successive teeth on a multi-toothed wheel coupled to the crankshaft by a magnetic sensor. By examining on-line the count data, the fastest crankshaft speed (lowest number of counts) and the slowest crankshaft speed (highest number of counts) can be determined.

A technique for determining an absolute torque measure for both the individual cylinders of a multi-cylinder internal combustion engine and for the overall engine is described. The technique provides a basis for meeting the needs of various control and diagnostic applications. The technique complements the subject matter of U.S. Ser. No. 452,372, as well as the technique for determining relative torque outputs of the cylinders discussed in the next section.

Optimum ignition timing in a spark ignited engine is a function of, among other quantities, the load torque under which the engine is operating. Thus, knowledge of the engine load torque is important to the engine controller. Since load torque information has not been directly available in the prior art, the load input has been obtained inferentially by use of data from a vacuum sensor in the intake manifold. High vacuum implied low load, and low vacuum implied high load. The disadvantages of such an input relate to the cost of the sensor, its reliability, its response time, and the difficulty of relating its value unambiguously to a single engine load torque. A further disadvantage is that, at best, only an overall engine measure is available, and not one that is valid on a cylinder-by-cylinder basis.

The torque measure of the present invention overcomes these difficulties. Most significantly, the input signal has been shown to be directly related to torque, the response time is immediate in conjunction with cylinder firing, individual cylinder torque measures are generated as part of the process, the sensor technology is well established, and, in some cases, the hardware already exists on-board the vehicle.

Because of the rapid response of the torque measurement scheme, a further gain can be achieved by using the torque measure to maximize the system efficiency on line. In this mode of operation the controller seeks the optimum ignition timing to maximize the engine torque output for a given fuel used. The technique to accomplish this involves dithering the spark timing so as to change its value in the direction of increasing torque output, a count amplitude increase. While dithering of a control to optimize response is a well known technique, its application to spark timing on an internal combustion engine has not been well received because of the slow response times inherent in previous schemes. The current scheme overcomes that difficulty and, in addition, provides for implementation of the technique on a cylinder-by-cylinder basis.

The properties of the fuel used in an engine have a significant effect on the performance of the engine. While gasoline fuels tend to be of fairly uniform quality at present, the same cannot be said for diesel fuel quality. This is particularly evident in long distance trucking where the fuel sources and contents can change dramatically. For diesel engines, the injection timing for optimum operation in terms of fuel economy, emission levels and performance is dependent on the properties of the fuel used.

The control technique described here is used to permit different grades of fuel to be burned in a given engine without modification to the engine. This is also of significant value in military applications where fuel sources are highly variable.

The cylinder torque measurement technique is also a tool for on-line engine diagnostics. Identification of individual cylinder torque outputs provides a basis for associating torque differences between cylinders with the cause of the variation. In this regard, knowledge of individual cylinder torque outputs provides information complementary to that disclosed in U.S. Ser. No. 452,372 providing relative torque outputs among cylinders, as well as the technique for determining relative torque outputs among the cylinders discussed below.

TORQUE FLUCTUATION (RELATIVE COMBUSTION EFFICIENCY) MEASURE ACQUISITION

The best control of cylinder-by-cylinder variations in engine performance can be obtained by using the crankshaft rotation from the point of slowest crankshaft speed on the power stroke of one cylinder to the point of slowest crankshaft speed on the power stroke of the next cylinder in the firing order.

For example, in FIG. 3, the number one cylinder in the firing order reaches TDC prior to beginning the power stroke at the crankshaft angle indicated as "TDC 1". The next cylinder in the firing order reaches TDC 720/N degrees later at TDC 2. Over the period of crankshaft rotation from TDC 1 to TDC 2, the net torque produced by the engine may be approximated as the torque produced by the number 1 cylinder. In other words, for the first 720/N degrees of the power stroke of a particular cylinder, the net engine torque may be approximated by the torque produced by that cylinder.

Between TDC 1 and TDC 2 the crankshaft speed fluctuation undergoes one cycle. In an ideal engine, the instantaneous speed at the same point in successive cycles would be the same (i.e., $S_1 = S_2 = \ldots = S_N$). The difference in the instantaneous speed at successive SS's, the points of slowest crankshaft speed during the firing intervals of successive cylinders in the firing order, as illustrated in FIG. 3, is a measure of the engine acceleration over the period. If $\Delta S_j$ is defined as $$\Delta S_j = S_{j+1} - S_j$$

where $S_j$ is the instantaneous crankshaft speed at the point of slowest crankshaft speed during the firing interval of a cylinder between the jth and j+first top dead center and $\Delta S_j$ is the change in slowest crankshaft speeds between successive firing intervals of successive cylinders in the firing order, then the acceleration $\dot{S}_j$ between the point SS j of slowest crankshaft speed $S_j$ and the point SS j+1 of slowest crankshaft speed $S_{j+1}$ is given as $$\dot{S}_j = \frac{\Delta S_j}{\Delta t} = \frac{S_{j+1} - S_j}{\Delta t}$$

Since engine acceleration is proportional to engine torque, a positive $\Delta S_j$ indicates a positive net torque over the period between SS j and SS j+1; a negative $\Delta S_j$ is indicative of a negative net torque. If each $\Delta S_j$ is associated with the torque produced by the cylinder which began its power stroke at TDC j, then the relative torque contribution of each cylinder in the engine can be evaluated.

At steady state the average engine and load torque measured over a suitable number of engine revolutions must be zero. That is, the torque produced by the combustion process in the engine required to maintain the desired speed is balanced by the load torque. In this case, the sum of the $\Delta S_j$ will approach zero. Defining $\overline{\Delta S_k}$ as the mean $\Delta S_j$ for several successive firings of the kth cylinder, it is found that, in general, $$\sum_{k=1}^{k=N} \overline{\Delta S_k} = 0$$

but, that $$\overline{\Delta S_k} \neq 0 \text{ for } k = 1, \ldots, N$$

That is, some cylinders produce more than the average torque and others produce less than the average. Large positive $\overline{\Delta S_k}$ are indicative of greater than average torque production by the associated cylinders, while large negative $\overline{\Delta S_k}$ indicate less than average torque production. This change in instantaneous engine speed between successive cylinders in the firing order reaching the point of slowest crankshaft speed on their power strokes forms the basis for determining the relative combustion efficiency measure.

According to the illustrative embodiments of the invention, the information necessary to calculate the relative combustion efficiency measure is derived from measuring the time intervals, $T_i$ for successive fixed angular rotations of the crankshaft. The relative combustion efficiency measure calculated in this manner supplies the same information as the $\overline{\Delta S_k}$ described above. The formulation of the relative combustion efficiency measure for each cylinder requires four steps: (1) measurement of the crankshaft time intervals $T_i$; (2)

on-line digital filtering of these measurements; (3) calculation of an index of performance (IP) for each firing; and (4) averaging the IP for each cylinder over successive firings.

The basis for calculating the relative combustion efficiency measure is the crankshaft time interval data. A multitooth wheel attached to the engine crankshaft, a stationary magnetic pick-up, and a digital electronic circuit are used to count the cycles of a high frequency clock which occur during a fixed angular rotation of the crankshaft. The measured counts of the clock are directly proportional to the time required for the crankshaft to rotate through the known angle. The relations between the measured counts over the fixed angle of rotation, the time interval of the rotation, and engine speed are given as:

$$C_i = f_{CLK} T_i \text{ (counts)}$$

$$\overline{S}_i = \frac{\Delta\theta}{6T_i} \text{ (RPM)}$$

where $C_i$ is the measured counts of the high frequency clock (counts), $f_{CLK}$ the clock frequency (Hz), $T_i$ the time interval for the crankshaft to rotate through $\Delta\theta$ degrees (seconds), $S_i$ the mean engine speed over the corresponding angle of rotation (RPM), and $\Delta\theta$ the angle through which the crankshaft rotates (degrees). The subscript i refers to the ith data point.

If the time interval, $T_i$, is eliminated from these equations, it is seen that the number $C_i$, counts measured over a given angle of rotation, is inversely proportional to the mean engine speed over this interval. That is, $$C_i = \frac{f_{CLK}\Delta\theta}{6} \cdot \frac{1}{\overline{S}_i}$$

Thus, if the counts for successive know angular rotations are measured, and the last equation is solved for $\overline{S}_i$ in terms of $C_i$, the curve of approximate instantaneous engine speed versus crankshaft angle can be reconstructed. For small values of $\Delta\theta$ this curve approaches the curve of instantaneous speed versus crankshaft angle shown in FIG. 2.

A plot of successive measured counts taken from an engine mounted on a test stand is shown in FIG. 4. For this case $\Delta\theta$ is 6 degrees and $f_{CLK}$ is 5 MHz. The high frequency noise superimposed on the signal is a result of measurement errors, most notably variations in successive $\Delta\theta$. These variations are a result of the inaccuracies of the tooth spacing on the multitooth wheel. Such errors can be reduced by using a higher precision wheel. Another means of reducing the noise is by filtering the data. The system described makes use of an on-line, non-recursive digital filtering technique to reduce the noise. FIG. 5 is a plot of the same data as shown in FIG. 4 after such filtering. The filter has successfully removed the noise, while the normal engine speed fluctuations have not been diminished.

The method for determining the relative torque contributions of each cylinder according to the invention requires the instantaneous speed only at crankshaft angles corresponding to the points of lowest crankshaft speed on the power strokes of the cylinders. Thus, the complete speed versus crankshaft angle curve need not be considered. Likewise, for the calculation of combustion efficiency based upon crankshaft data, the complete curve is not needed.

Define $C_i$ as the ith unfiltered data point and $\hat{C}_i$ as the ith filtered data point. The non-recursive filtering scheme used in the control system makes use of nine unfiltered data points to calculate each filtered data point. The four unfiltered data points on either side of the point of interest plus the unfiltered data point itself are used. That is $$\hat{C}_i = f(C_{i-4}, C_{i-3}, C_{i-2}, C_{i-1}, C_i, C_{i+1}, C_{i+2}, C_{i+3}, C_{i+4})$$

Now, if $Q_j$ is defined as the unfiltered data point coinciding with the jth point of lowest crankshaft speed and assuming that the first point of lowest crankshaft speed (j=1) corresponds to the mth data point, then $$Q_j = C_n; \quad n = \left(2\frac{n_t}{N}\right)(j-1) + m$$

where $n_t$ is the number of teeth on the multitooth wheel and N the number of cylinders in the engine. Defining $\hat{Q}_j$ as the filtered data point corresponding to $Q_j$, $$\hat{Q}_j = f(C_{n-4}, C_{n-3}, C_{n-2}, C_{n-1}, C_n, C_{n+1}, C_{n+2}, C_{n+3}, C_{n+4})$$

Thus, the $Q_j$ are inversely related to the $S_j$ illustrated in FIG. 5.

The index of performance for each cylinder is calculated based on the filtered data points at successive points of slowest crankshaft speed on the power strokes of successive cylinders. Thus, $$IP_j = \hat{Q}_j - \hat{Q}_{j+1}$$

A negative $IP_j$ corresponds to an increase in counts from SS j to SS j+1. This indicates that the engine speed has decreased in the period between successive SS's, and that the net torque is negative. A positive $IP_j$ is indicative of an increase in engine speed and a positive net torque. The magnitude of the $IP_j$ is a measure of the change in speed over a fixed crankshaft rotation, which is proportional to the acceleration and thus to the net torque. To establish this relationship, it is noted that $$\overline{S}_j = \frac{\Delta\theta}{6T_j}$$

where $S_j$ is the mean engine speed over the $\Delta\theta$ degrees of crankshaft rotation about the point of slowest crankshaft speed on the power stroke of the cylinder. For small $\Delta\theta$ $$S_j \approx \overline{S}_j$$

where $S_j$ is the instantaneous engine speed at the jth point of slowest crankshaft speed on the power stroke of the jth cylinder. Thus, $$\dot{S}_j = \frac{S_{j+1} - S_j}{t_{j+1} - t_j} \approx \frac{\overline{S}_{j+1} - \overline{S}_j}{t_{j+1} - t_j}$$

where $\dot{S}_j$ is the net engine acceleration between successive points of slowest crankshaft speed on the power stroke of successive cylinders, and $t_j$ and $t_{j+1}$ are the times at which the SSth and SS+1st points are reached respectively. Defining $\Delta t_j$ as the elapsed time between SS j and SS j+1

$$\Delta t_j = t_{j+1} - t_j$$

yields $$\dot{S}_j \approx \frac{\bar{S}_{j+1} - \bar{S}_j}{\Delta t_j}$$

However:

$$\hat{Q}_j = \frac{K_1}{\bar{S}_j}$$

where $K_1$ is a function of the clock frequency and the tooth spacing. Solving this equation for $\bar{S}_j$ in terms of $Q_j$ and substituting into the preceding one yields $$\dot{S}_j \approx \frac{K_1 IP_j}{\hat{Q}_j \hat{Q}_{j+1} \Delta t_j}$$

It can be shown that $$\frac{\int_{t_j}^{t_{j+1}} T_q(t)dt}{\Delta t_j} \propto \frac{\bar{S}_{j+1} - \bar{S}_j}{\Delta t_j} \approx \dot{S}_j$$

where $T_q$ is the net torque. These last two equations thus provide the desired relationship between $IP_j$ and the net torque over the interval.

The $IP_j$ are a measure of the torque produced during the firing of each cylinder. A negative $IP_j$ is indicative of a "poor" combustion event (less than average torque-producing event) while a positive $IP_j$ is indicative of a "good" combustion event (greater than average torque-producing event).

The torque produced by a given cylinder will vary from cycle to cycle due to the variation in the combustion events in the cylinder. To get an accurate measure of the relative torque produced by a given cylinder, the $IP_j$ must be averaged for several successive firings. The relative combustion efficiency measure for a cylinder is defined as $$IP_k = \frac{\sum_{i=1}^{M} IP_{ik}}{M} \quad k = 1, \ldots, N$$

where $IP_k$ is the relative combustion efficiency measure for the kth cylinder in the firing order, $IP_{ik}$ is the IP for the kth cylinder on the ith firing, and M is the number of successive firings over which the IP's are to be averaged.

The individual cylinder indices of performance, IP, also form the basis for on-line roughness measurement. Engine roughness is a result of uneven torque production among the cylinders and variations in the torque produced in the same cylinder from cycle to cycle. The index of performance contains information concerning the relative torque production during each cylinder firing. The roughness index, $\hat{R}_i$, is defined as $$\hat{R}_i = \sum_{k=1}^{N} |IP_{ik}|$$

where $|IP_{ik}|$ is the absolute value of the IP for the kth cylinder during the ith engine cycle.

At steady state, the algebraic sum of the individual performance indices (IP) over an integral number of engine cycles will tend to zero. However, the IP for the individual cylinders will have some non-zero values. The magnitude of the IP is a measure of the variation of the individual cylinder torque production from the mean. The sum of the absolute values of IP over an engine cycle is then an indication of the torque variation from cylinder to cylinder during this cycle. Large values for the roughness index indicate large variations in cylinder to cylinder torque production which results in increased engine roughness. Thus, the value for $\hat{R}_i$ is a quantifiable measure of engine roughness.

The roughness index may be used in a feedback control system such as a closed-loop idle mode controller, or as a tool for evaluating engine control strategies.

A TORQUE AND TORQUE FLUCTUATION (RELATIVE COMBUSTION EFFICIENCY) MONITOR

A schematic diagram of the system used for determining the engine and cylinder torques and torque fluctuation (relative combustion efficiency) measures on an internal combustion engine is shown in FIG. 8. A pair of magnetic pick-ups 120, 122 are mounted in close proximity to rotating, multitooth wheels 124, 126, respectively. One wheel 124 is mounted to the crankshaft 130 of a multiple cylinder internal combustion engine 132. Wheel 124 is used in conjunction with the associated magnetic pick-up 120 and an associated trigger circuit 134 to generate a signal at fixed angular positions of the crankshaft 130. The second wheel 126 is mounted to the engine 132 distributor shaft 136 in the case of a spark ignited engine (the terminology would change in the case of a compression ignited engine but the methodology would be the same). Wheel 126, the associated magnetic pick-up 122, and a trigger circuit 140 are used in generating a reference to top dead center of the beginning of the power stroke in each cylinder of engine 132.

A clock 142 provides pulses at 6 MHz to a digital interval timer (DIT) 144. DIT 144 includes fourteen parallel outputs $d_0, d_1, d_2 \ldots d_{12}, d_{13}$, and a $\overline{V}_{count}$ output. $\overline{V}_{count}$ is coupled to an input of a programmable interrupt mask (PIM) 146. Trigger circuits 134, 140 provide signal conditioning for the output signals of the magnetic pick-ups 120, 122, respectively. Clock 142 and DIT 144 measure the elapsed time for successive fixed angular rotations of the crankshaft 130. DIT 144 and PIM 146 generate and transmit signals to a microprocessor 150. The microprocessor 150 receives the data from the other electronic circuitry, and performs the filtering and calculations necessary to determine the torque and torque fluctuation (relative combustion efficiency) measures.

The operation of this system is described below. As each tooth of the wheel 124 passes the stationary magnetic pick-up 120, a voltage, $v_{mag}$, is generated. When $v_{mag}$ provides a negative-going zero crossing, the trigger voltage, $V_{trig}$, goes low (0 volts). A low $\overline{V}_{trig}$ signal to the DIT 144 causes the contents of a 16-bit up-counter in the DIT 144 to be loaded in parallel into a 16-bit latch at the output of the DIT 144. The low $\overline{V}_{trig}$ signal also causes the up-counter in DIT 144 to be cleared, and counting of the high frequency clock pulses, $V_{CLK}$, to be resumed. Further, the low $\overline{V}_{trig}$ signal causes the $\overline{V}_{count}$ line from the DIT 144 to the PIM 146 to go low to indicate that data is ready for processing. Finally, as $\overline{V}_{trig}$ goes low, depending on the state of the RESET line from the microprocessor 150 and an internal signal, the PIM 146 either transmits the "data ready" signal to the microprocessor 150 by setting the $\overline{V}_{DR}$ line low, or blocks the "data ready" signal from the microprocessor 150 by holding the $\overline{V}_{DR}$ line high.

Upon receipt of a low $\overline{V}_{DR}$ signal, the microprocessor 150 reads the contents of the 14 least significant bits of the latch, $d_0$-$d_{13}$. This 14-bit number is proportional to the time for two successive teeth of the multitooth wheel 124 to pass the magnetic pick-up 120. After the contents of the latch are read, the microprocessor 150 toggles the $\overline{V}_{RES}$ line to acknowledge that the data has been read. This causes the $\overline{V}_{DR}$ line to go high. The data read by the microprocessor 150 is filtered using digital filtering. The filtered data is used to calculate a torque measure ($CA_k$) and a torque fluctuation (relative combustion efficiency) measure ($IP_k$) for each cylinder as will be described.

The second magnetic pick-up 122 mounted adjacent the distributor generates a voltage, $V_{dist}$, at the passage of each lobe of the fitting 126 connected to the distributor shaft 136. This fitting 126 has one lobe for each cylinder of the engine 132 and is positioned such that the output of the trigger circuit, $\overline{V}_{TDC}$, makes a high-to-low transition coincident with the corresponding cylinder reaching TDC. The $\overline{V}_{TDC}$ line remains low for approximately 60 micro-seconds and then returns high. The $\overline{V}_{TDC}$ signal is used by the microprocessor 150 (1) to reference top dead center, (2) to determine the points of slowest and fastest crankshaft speed on the power stroke of the corresponding cylinder, and, (3) in conjunction with a clock on board the microprocessor, to determine engine 132 speed. As discussed previously, the points of slowest and fastest crankshaft speed can be prestored values in microprocessor 150, typically a predetermined number of degrees after TDC, or can be determined on-line.

Figure 9:
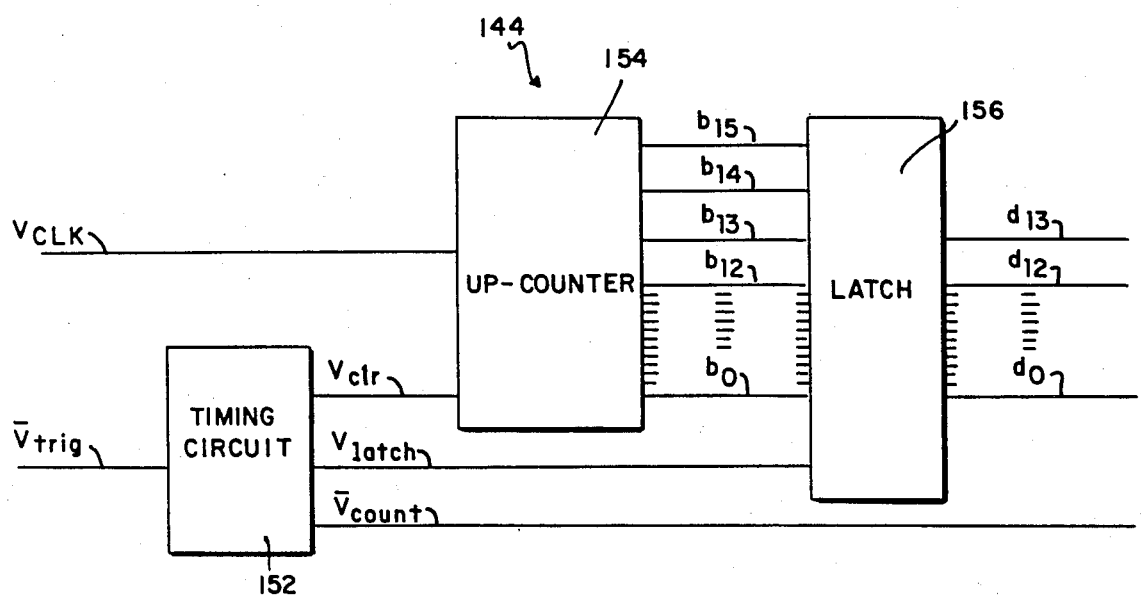
FIG. 9 is a block diagram of a portion of the system illustrated in FIG. 8.
Figure 10:
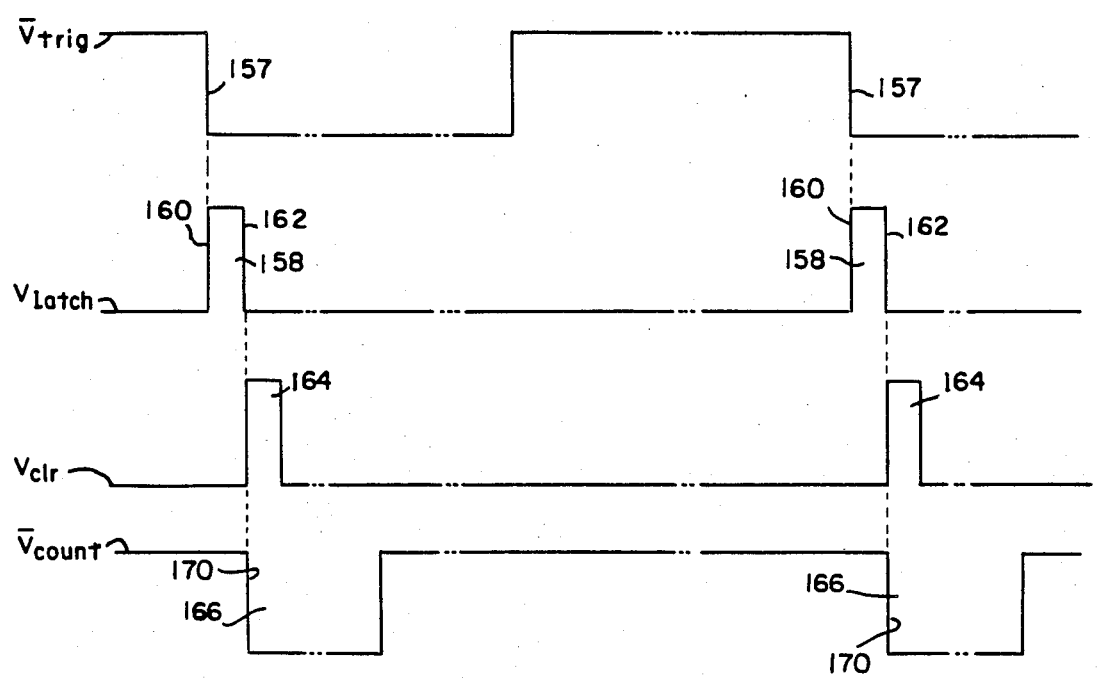
FIG. 10 is a timing diagram of the system illustrated in FIG. 9.

The schematic of the DIT 144 circuit is shown in FIG. 9. The three basic components of this circuit are a timing circuit 152, an up-counter 154, and a latch 156. The timing diagram for the DIT 144 is shown in FIG. 10.

The $\overline{V}_{trig}$ signal is the input to the timing circuit 152. The outputs of circuit 152 are $V_{clr}$, $V_{latch}$, and $\overline{V}_{count}$. On the falling edge 157 of the $\overline{V}_{trig}$ signal (FIG. 10), the timing circuit 152 generates a pulse 158 (FIG. 10) of approximately 75 n-sec duration on the $V_{latch}$ line. On the rising edge 160 (FIG. 10) of the $V_{latch}$ signal, the contents of the up-counter 154 are loaded in parallel into the 16-bit latch 156, and appear at the output $d_0, \ldots d_{13}$ of the latch 156. On the falling edge 162 (FIG. 10) of the $V_{latch}$ signal, a 75 n-sec positive pulse 164 appears on the $V_{clr}$ line, causing the up-counter 154 to be reset at zero. Counting resumes when the $V_{clr}$ line goes low at the end of the pulse 164. Also on the falling edge 162 of the $V_{latch}$ pulse, the $\overline{V}_{count}$ line goes low, at 166 in FIG. 10, for approximately 8.8 μ-sec.

The PIM 146 has two functions, on to mask from the microprocessor 150 that data which is not needed in calculating the relative combustion efficiency measure, and also to hold the data ready line, $\overline{V}_{DR}$, low until the data has been read by the microprocessor 150. In the control system described here, a wheel 124 having sixty teeth is used. Thus, for a six-cylinder, four-stroke engine 132, twenty data points are measured for each engine firing (sixty teeth per revolution divided by three cylinders firing per revolution). Since eighteen data points per firing are used by the microprocessor 150 to calculate the torque measure and the torque fluctuation (relative combustion efficiency) measure (nine at each speed point), two unneeded data points are successively latched onto the output $d_0 \ldots d_{13}$ of the DIT 144 for each firing. This description assumes the points of slowest and fastest speed are spread appropriately in the cycle. Alternatively, all count data could be signaled to the microprocessor 150 and the unneeded values simply ignored by the microprocessor 150. The PIM 146 prevents the data ready signal $\overline{V}_{DR}$ corresponding to these unnecessary data points from being transmitted to the microprocessor 150, thus allowing the microprocessor 150 to continue program execution without undue interruptions.

When a new data point has been latched onto the output $d_0 \ldots d_{13}$ of the DIT 144, it generates a low pulse of approximately 8.8μ-sec duration on the $\overline{V}_{count}$ line. The PIM 146 masks some of these signals from the microprocessor 150, and transmits others via the $\overline{V}_{DR}$ line. When a data point that is to be transmitted to the microprocessor 150 becomes available at the latch 156, the $\overline{V}_{DR}$ line from the PIM 146 is brought low on the falling edge 170 of the $\overline{V}_{count}$ pulse. The $\overline{V}_{DR}$ line will remain low until the microprocessor 150 has read the data point and acknowledges that the point has been read by toggling the $\overline{V}_{RES}$ line.

Figure 11:
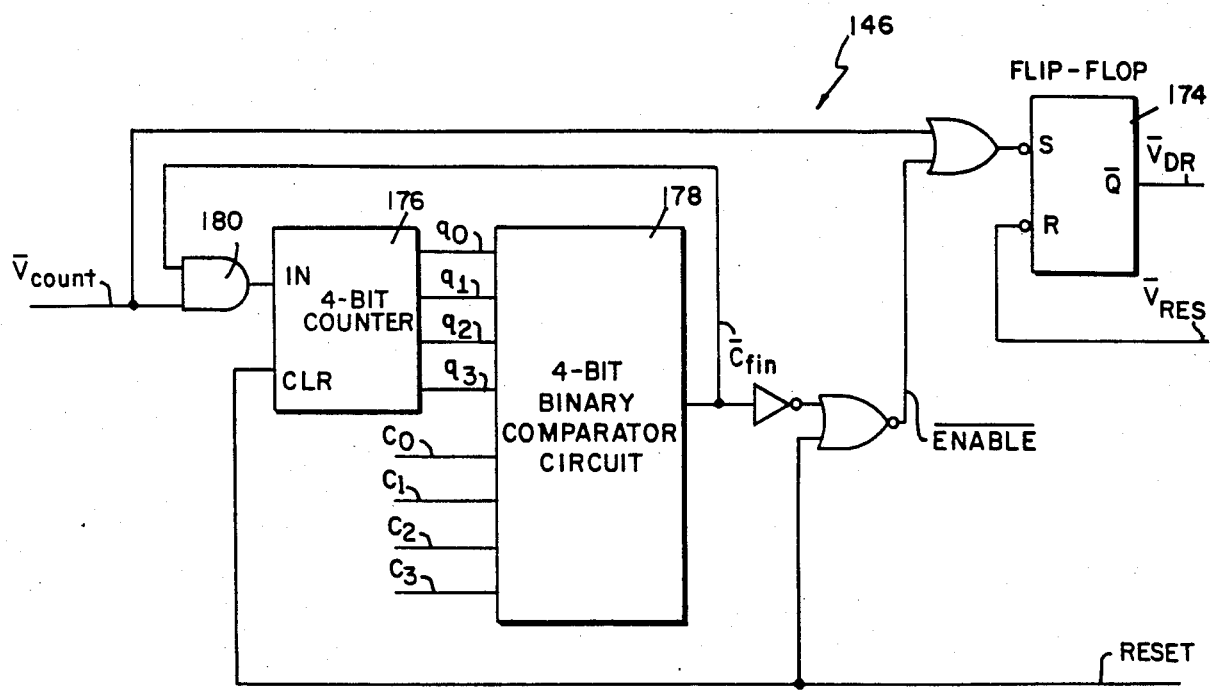
FIG. 11 is a block diagram of another portion of the system illustrated in FIG. 8.

FIG. 11 is the schematic diagram of the PIM 146. The inputs to the PIM 146 are $\overline{V}_{count}$, $\overline{V}_{RES}$, and RESET. The output is $\overline{V}_{DR}$. During the masking operation of the PIM 146, the $\overline{\text{ENABLE}}$ line is held high, blocking the $V_{count}$ signals from being transmitted to the S input of a SET-RESET flip-flop 174. This causes the $\overline{V}_{DR}$ line to be held high. The $\overline{\text{ENABLE}}$ line becomes active (low) when either the RESET line from the microprocessor 150 (FIG. 8) is brought high, or the $\overline{C}_{fin}$ line goes low. A low $\overline{\text{ENABLE}}$ causes the $\overline{V}_{count}$ signals to be transmitted to the flip-flop 174. Upon receipt of a low signal at the S input, the output of the flip-flop 174, $\overline{V}_{DR}$, goes low and remains low until the R input, $\overline{V}_{RES}$, is brought active low by the microprocessor 150.

A 4-bit binary counter 176 is used in the PIM 146 to keep track of the number of data points being masked from the microprocessor 150. When the RESET line is high, the counter 176 is disabled and the outputs $q_0$-$q_3$, are held at zero. Once the RESET line is brought low, the counter 176 is enabled. The output, $\overline{C}_{fin}$, of a four-bit binary comparator circuit 178 is low whenever the output $q_0$-$q_3$ of the binary counter 176 matches the four-bit binary word $c_0$-$c_3$ which is entered via a set of switches (not shown). This binary word $c_0$-$c_3$ sets the number of data points that will be masked from the microprocessor 150 following the high-to-low transition of the RESET line. When the RESET line is initially brought low, the output of the binary counter 176 is zero; assuming that $C_0$-$C_3$ are not all zero, the comparator 178 output, $\overline{C}_{fin}$, will be high. This enables the $\overline{V}_{count}$ signal to be transmitted to the input of the counter 176 through an AND gate 180. The binary counter 176 increments by one for each high-to-low transition of the $\overline{V}_{count}$ line. When the output $q_0$-$q_3$ of the counter 176 matches the value set by $c_0$–$c_3$, the $\overline{C}_{fin}$ line will go low. This causes the $\overline{ENABLE}$ line to become active and permits subsequent $\overline{V}_{count}$ pulses to be transmitted to the flip-flop 174. Simultaneously, further pulses of $\overline{V}_{count}$ are blocked from the input of the counter 176 by the low condition of the $\overline{C}_{fin}$ line and AND gate 180 input coupled to $\overline{C}_{fin}$, until the counter 176 is cleared by a high signal from the RESET line.

Figure 12:
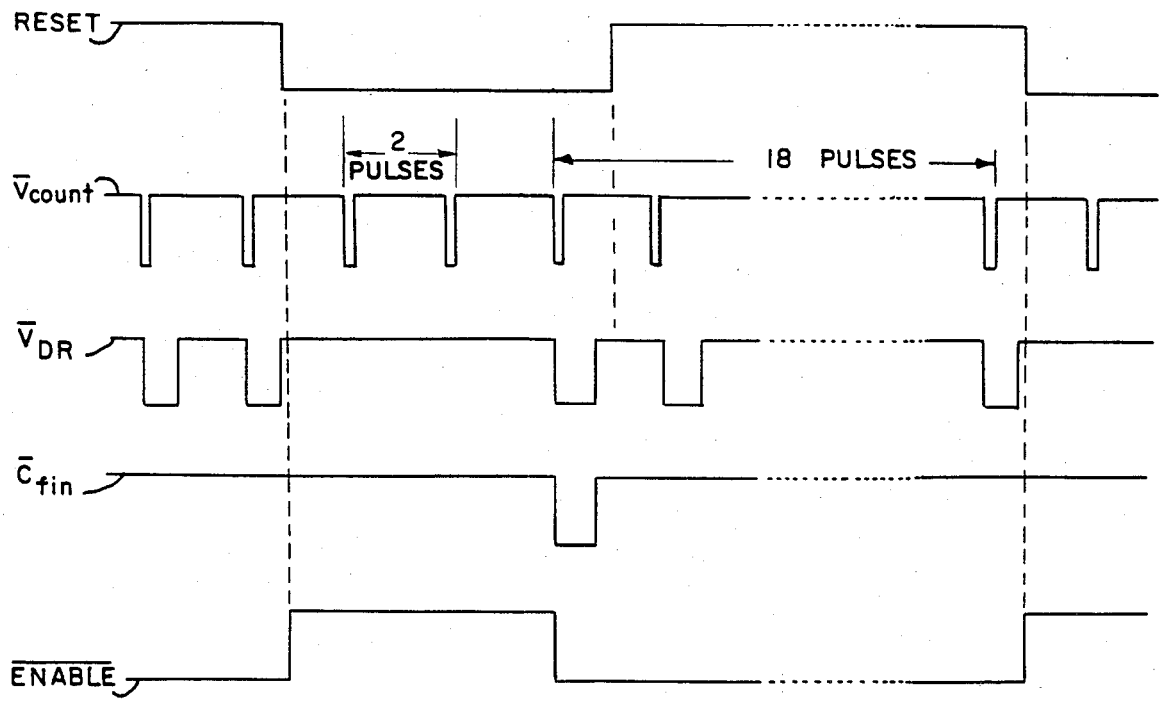
FIG. 12 is a timing diagram of the system illustrated in FIG. 11.

Returning to FIG. 8, on start-up of the engine 132 control program, the microprocessor 150 activates the RESET line, thus enabling the $\overline{V}_{count}$ pulses to be transmitted through the PIM 146. Using $\overline{V}_{TDC}$ as a reference to TDC, the microprocessor 150 synchronizes the data-taking operations with the crankshaft 130 position. This is done by counting the number of $\overline{V}_{DR}$ pulses following the first $\overline{V}_{TDC}$ pulse. When the proper number of $\overline{V}_{DR}$ pulses have been received, the microprocessor 150 begins to read the data from the DIT 144 output $d_0$–$d_{13}$ on each $V_{DR}$ pulse. Eighteen data points are read, and then the microprocessor 150 brings the RESET line low to mask the next two data points. This is illustrated in the timing diagram in FIG. 12. The next two $V_{count}$ pulses are masked from the microprocessor 150 by the PIM 146. On the third $\overline{V}_{count}$ pulse following the high-to-low transition of the RESET line, $\overline{C}_{fin}$ goes low enabling the $\overline{V}_{DR}$ line. That is, the third pulse of $\overline{V}_{count}$ is transmitted to the microprocessor 150 on the $\overline{V}_{DR}$ line. Upon receipt of the first $\overline{V}_{DR}$ pulse, the microprocessor 150 sets the RESET line high and holds it high until eighteen data points have been read. The RESET line is then brought low to initiate the masking operation again. This process is repeated as long as the program is in operation.

TORQUE MEASURE AND TORQUE FLUCTUATION (RELATIVE COMBUSTION EFFICIENCY)-BASED ENGINE CONTROLS

The problem of delivering a uniform mixture of air and fuel to each cylinder of a multicylinder internal combustion engine is well known. In carbureted engines and engines with single point fuel injection systems, it is difficult to design an intake manifold capable of distributing the mixture of air and fuel equally among the cylinders. Even in multipoint fuel injection systems (in either spark or compression ignition engines), there will be variation in the amount of fuel delivered to the cylinders due, e.g., to tolerance variations in the injectors.

The optimum ignition timing in spark ignition engines or optimum injection timing in diesel engines for the efficient combustion of an air/fuel mixture is a function of, among other parameters, the mass of fuel and the ratio of air to fuel in the cylinder. The controls described herein adjust the timing to each cylinder independently, thus compensating for the non-uniform distribution of air and fuel among the cylinders. The timing is set for the most efficient combustion of the mixture in each cylinder.

Engine crankshaft speed information is used to calculate both a torque measure and a torque fluctuation (relative combustion efficiency) measure for each cylinder. The torque measure is used to set the basic level of the spark advance, while the torque fluctuation (relative combustion efficiency) measure is used as the basis for adjusting the timing to the individual cylinders. As the composition of the combustible mixture to the cylinders changes with changing engine operating conditions, the control continues to adjust the timing for optimum combustion.

Figure 13:
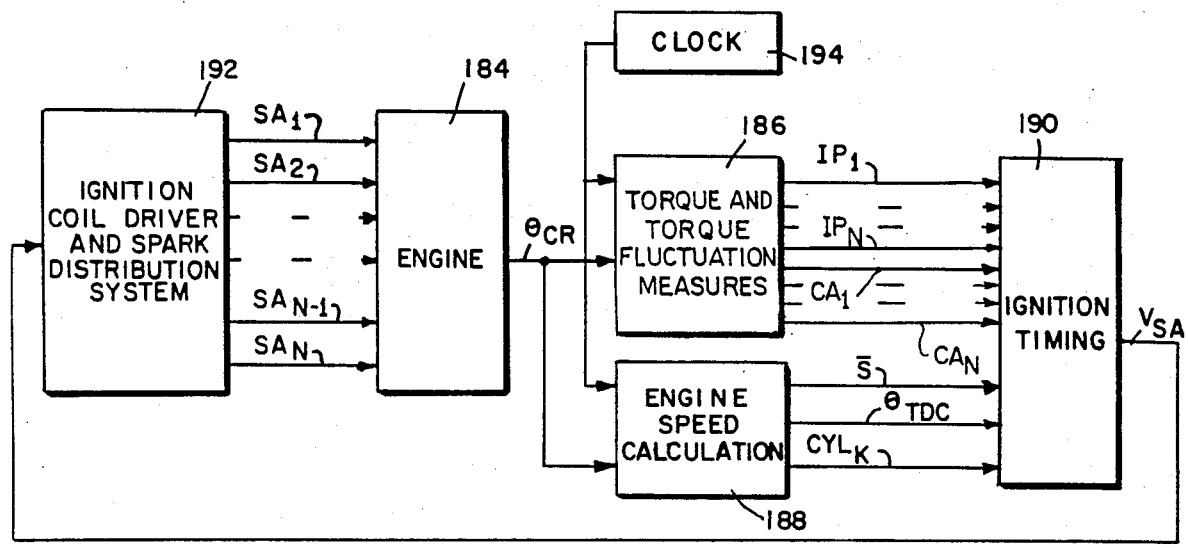
FIG. 13 is a block diagram of a system for controlling the performance of a multiple cylinder internal combustion engine according to the present invention.

A block diagram illustration of a control system implemented on a spark ignition engine and used to set ignition timing is shown in FIG. 13. Implementations in which fuel delivery balance is controlled follow directly. The engine 184 crankshaft position, $\theta_{CR}$, as a function of time is used by a torque measure and torque fluctuation (relative combustion efficiency) measure calculation system 186 to derive both a torque measure ($CA_k$) and torque fluctuation (relative combustion efficiency) measure ($IP_k$) for each cylinder in engine 184. The torque measure is based upon the differences in the slowest and fastest speeds in a firing cycle, while the torque fluctuation (relative combustion efficiency) measure uses the differences between the slowest crankshaft speeds in successive firing cycles of the cylinders. An engine speed calculation system 188 uses the crankshaft position $\theta_{CR}$ as a function of time to calculate the mean engine speed, $\overline{S}$, to generate a reference to top dead center, $\theta_{TDC}$, and to index the cylinder position in the firing order, $CYL_k$. An ignition timing system 190 determines the optimum spark advance for each cylinder based on the torque measure ($CA_k$) and the torque fluctuation (relative combustion efficiency) measure ($IP_k$) from system 186 and the mean engine speed $\overline{S}$ from system 188. The cylinder index, $CYL_k$, mean engine speed, $\overline{S}$, and top dead center reference, $\theta_{TDC}$, are used to time the ignition signal, $V_{SAk}$, transmitted to the ignition coil driver and spark distribution system 192 to assure the proper spark advance to each cylinder of engine 184. A clock 194 generates the time base for the time-dependent functions of systems 186, 188.

Figure 14:
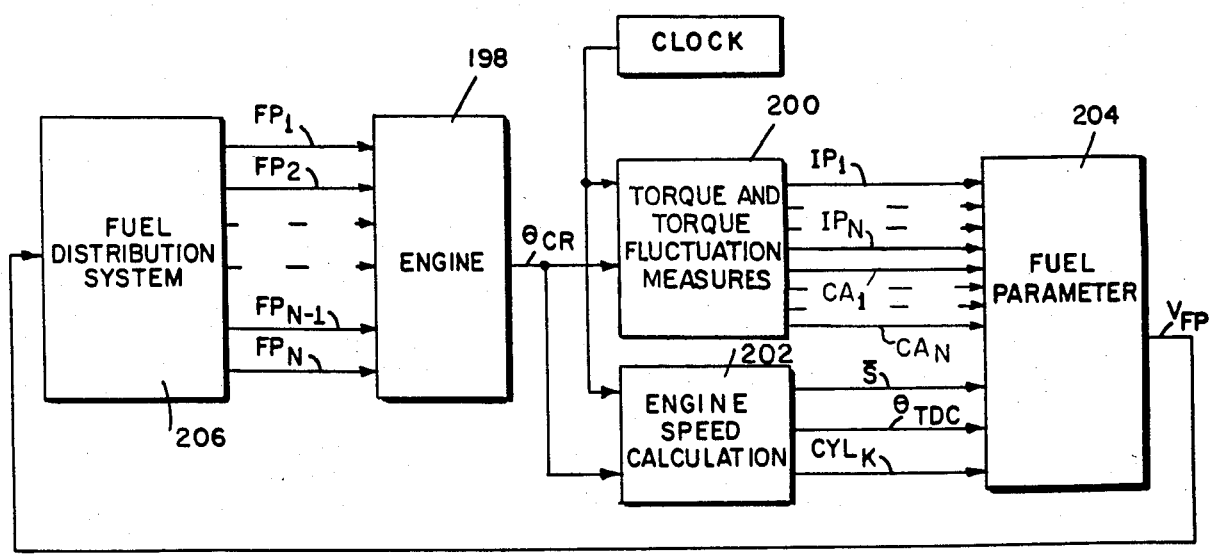
FIG. 14 is a block diagram of a system for controlling the performance of a multiple cylinder internal combustion engine according to the present invention.

The implementation of this control on a compression ignition engine is illustrated in FIG. 14. In this application, the fuel injection timing, $FP_k$, to each cylinder, $CYL_k$, is the controlled variable. The engine 198 crankshaft position, $\theta_{CR}$, as a function of time is used by a torque measure and torque fluctuation (relative combustion efficiency) measure calculation system 200 to derive a torque measure ($CA_k$) and a torque fluctuation (relative combustion efficiency) measure ($IP_k$) for each cylinder in engine 198 based upon the differences in the slowest and fastest speeds in a firing cycle and upon relative slowest crankshaft speeds in successive firing cycles of the cylinders. An engine speed calculation system 202 uses the crankshaft position, $\theta_{CR}$, as a function of time to calculate the mean engine speed, $\overline{S}$, to generate a reference to top dead center, $\theta_{TDC}$, and to index the cylinder position in the firing order, $CYL_k$. A fuel parameter (in this case, injection timing) system 204 determines the optimum fuel injection timing for each cylinder in engine 198 based on the torque measure ($CA_k$), the torque fluctuation (relative combustion efficiency) measure ($IP_k$) and the mean engine speed $\overline{S}$. The cylinder index, $CYL_k$, mean engine speed, $\overline{S}$, and top dead center reference, $\theta_{TDC}$, are used to time the fuel injection signal, $V_{FPk}$, transmitted to the fuel distribution system 206 to assure the proper fuel injection timing to each cylinder.

It should be noted that the fuel system parameter $FP_k$ controlled could also be fuel amount injected (controlled, for example by injector nozzle open time or fuel system pressure adjustment), or some combination of fuel injection timing and amount of fuel injected.

AN ADAPTIVE IDLE SPEED CONTROL

Another control strategy using the inventive control system makes use of the fact that the fuel consumed by an idling engine is proportional to the engine speed-the lower the speed, the less fuel used. However, as the engine speed is lowered, the engine tends to run rougher. The optimum engine idle speed is the lowest speed at which the roughness is not objectionable. This speed changes with both engine operating and environmental conditions. An adaptive idle speed control system is based upon the system described above.

Figure 15:
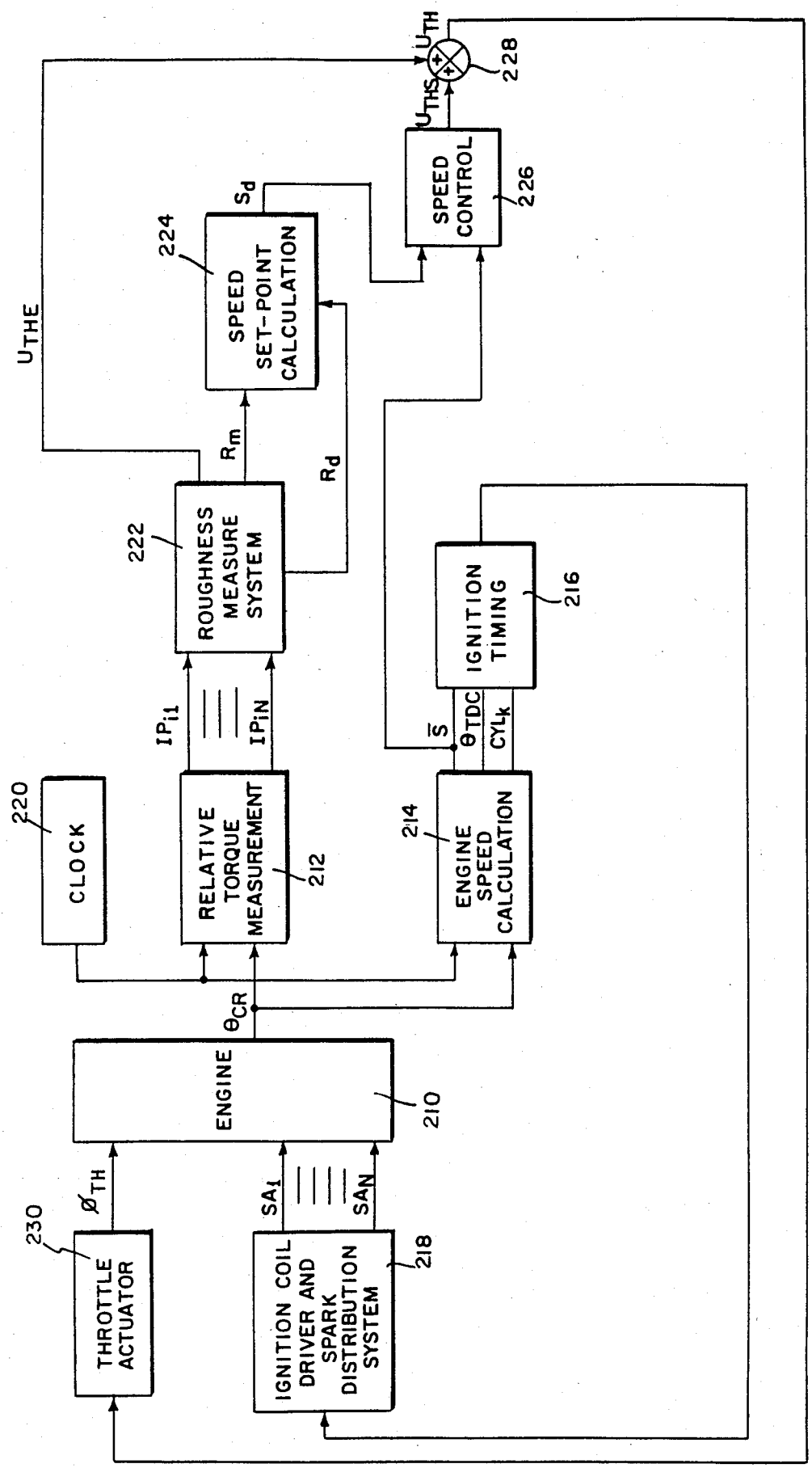
FIG. 15 is a block diagram of a system for controlling the idle speed of a multiple cylinder internal combustion engine constructed according to one aspect of the present invention.

The idle mode control system is shown in FIG. 15. The idle control seeks to maintain the lowest engine speed consistent with a preset desired engine roughness level, $R_d$, under any combination of engine operating and environmental conditions. The speed is controlled by manipulating the throttle via associated control and power circuitry (throttle actuator).

The engine crankshaft position, $\theta_{CR}$, as a function of time is used by a relative torque calculation system to derive the index of performance ($IP_{ik}$) for each firing of each cylinder in the engine based upon relative slowest crankshaft speeds in successive firing cycles of the cylinders. A roughness measure calculating system uses the $IP_{ik}$ to derive a roughness index, $\hat{R}_i$, for each engine cycle. This roughness index is then filtered to produce the measured engine roughness, $R_m$. The speed set-point calculating system compares the measured engine roughness with a preset roughness set-point, $R_d$, and adjusts the speed set-point, $S_d$, to reduce the error between $R_d$ and $R_m$.

An engine speed calculating system uses the crankshaft position as a function of time to calculate the mean engine speed, $\bar{S}$, to generate a reference to top dead center, $\theta_{TDC}$, and to index the cylinder in the firing order. A speed control system filters the mean engine speed to determine a measured engine speed $S_m$. The measured engine speed and speed set-point are compared. The throttle actuating signal, $u_{THS}$, is determined in such a way as to reduce any error between the measured engine speed and speed set-point. The throttle actuator translates the electronic signal from the speed control unit into actual throttle motion, $\phi_{TH}$.

An ignition timing system uses the mean engine speed, $\bar{S}$, top dead center reference signal, $\theta_{TDC}$, and cylinder index $CYL_k$ to time the signal, $V_{SAk}$, transmitted to the ignition coil drive and spark distribution system to assure proper spark advance to each cylinder of the engine.

In addition, the roughness measurement system may generate a throttle actuator signal, $u_{THE}$, to initiate emergency throttle action in the event that the engine is about to stall. This emergency throttle action signal is based upon the individual cylinder index of performance and gives a much earlier indication of sudden drops in speed than the measured engine speed value, $S_m$.

The desired roughness set-point, $R_d$, is modified based on the frequency with which emergency action is required. The need for frequent emergency action indicates that the engine is operating in a region very near the point where it will stall. This condition suggests that the roughness set-point has been set too high. Thus, when the frequency with which emergency action is initiated exceeds a limiting value, the roughness set-point is decreased. This feature allows the idle mode controller to adapt to the engine and the environment in which it is being used. The addition of the adaptive feature frees the controller from dependence on pre-set calibrations.

The implementation of the torque fluctuation (relative combustion efficiency) measure control on a spark ignition engine for idle speed control is illustrated in FIG. 15. In this application, the engine 210 crankshaft position, $\theta_{CR}$, as a function of time, is used by a combustion efficiency measure calculation system 212 to derive a relative combustion efficiency measure ($IP_{ik}$) for each cylinder in engine 210 based upon relative slowest crankshaft speeds in successive firing intervals of the cylinders. An engine speed calculation system 214 uses the crankshaft position $\theta_{CR}$ as a function of time to calculate the mean engine speed, $\bar{S}$, to generate a reference to top dead center, $\theta_{TDC}$, and to index the cylinder position in the firing order, $CYL_k$. An ignition timing system 216 determines the spark advance for each cylinder based on the crankshaft position, the top dead center reference, and the cylinder position in the firing order from engine speed calculation system 214. This system can readily be modified so that $CA_k$ and $IP_k$ can be concurrently used to optimize fuel injection timing. The ignition timing system 216 supplies this information to an ignition coil driver and spark distribution system 218 to assure proper spark advance to each cylinder of engine 210. A clock 220 generates the time base for the time-dependent functions of systems 212, 214.

The roughness measure calculating system 222 of the present invention uses the indices of performance, $IP_{ik}$, to derive the roughness index which is filtered to provide the measure $R_m$, measured engine roughness. In addition, the engine roughness measure calculation system 222 provides an emergency throttle control signal $u_{THE}$, based upon the individual cylinders' indices of performance. The signal $u_{THE}$ provides an essentially immediate indication that emergency throttle action is necessary to prevent the engine 210 from stalling. The signal $R_m$ is passed to a speed set-point calculation system 224 wherein the measured roughness is compared with a continuously updated desired roughness set-point signal $R_d$. The desired speed output signal $S_d$ from the speed set-point calculation system 224 is supplied to an engine speed control comparator 226 wherein it is compared to the mean engine speed signal, $\bar{S}$, provided by the engine speed calculation system 214. A non-emergency throttle control signal $u_{THS}$ is provided by the speed control 226. The signal, $u_{THS}$, is summed in a summer 228 with the emergency throttle control signal $u_{THE}$ provided by the roughness measure calculating system 222 to generate the throttle actuator signal $u_{TH}$ which is fed back to the throttle actuator 230 of the system. The output $\phi_{TH}$, throttle position, provided by throttle actuator 230, controls the position of the engine 210 throttle.

FIG. 16 illustrates a generalized form for the program control flow chart. After the program starts and all variables are initialized, the program enters a background routine. The background routine for an engine performance controller constructed in accordance with the present invention is illustrated in FIG. 17a. In this routine, the program waits for interrupts to go to a filter sub-routine. The program is in the filter sub-routine or one of its related sub-routines when the engine is under the control of the engine performance controller. The background routine for an engine performance monitor constructed according to the present invention is illustrated in FIG. 17m. In this routine, the program continuously scans a command keyboard for inputs which are basically commands for certain data to be outputted onto a CRT or screen. Upon the occurrence of such a command, the data requested is output to the screen, and the background routine returns to the scan mode.

The interrupts from FIG. 17a or FIG. 17m cause the program to enter a filter sub-routine, FILT, flow-charted at FIG. 17b. As discussed in connection with the six-cylinder, four-stroke cycle engine having a sixty-tooth wheel coupled to its crankshaft, for each combustion event nine data points centered about the point of slowest crankshaft speed are used in engine performance calculation. In the filter sub-routine, a data point is first read and multiplied by a filter coefficient. Then, in a decision block, the program determines whether the last data point read is the last (ninth) data point to be read during the current combustion event. If it is not, a data point counter is incremented and the program returns to await the next data point. If the last data point read is the ninth data point, the counter is cleared and the nine data points centered about the point of slowest crankshaft speed are used to calculate the index of performance. This is done by an index of performance sub-routine noted in the general flow chart of FIG. 16.

If the engine roughness control of FIG. 15 is being operated by the program, the index of performance sub-routine is as illustrated in FIGS. 17c–d. After the index of performance calculation is made as previously discussed, the index of performance sub-routine reaches a decision block in which the index of performance is compared to an unacceptable engine roughness level RUFEMG. An individual cylinder index of performance not greater than RUFEMG causes the emergency counter EMGCNT to be incremented. EMGCNT is the number of successive cylinders in the firing order with indices of performances algebraically less than RUFEMG, the roughness level requiring emergency throttle action. In the next decision block, EMGCNT is compared to the emergency count limit, EMGLIM. EMGLIM is the number of successive "bad" cylinder firings needed to initiate emergency throttle action. If EMGCNT has reached the EMGLIM limit, the emergency flag EMGFLG is set, the cumulative emergency counter EMGSUM is incremented, and the throttle control output $u_{THIN}$ is set equal to EMGTH, after which a control signal is output to the throttle actuator through the throttle actuator control sub-routine illustrated in FIGS. 17j–17l.

EMGCNT is then set to 0, the index of performance of the cylinder is stored and its absolute value added to the sum of the absolute magnitudes of the indices of performance of the various cylinders. In the next decision block, the program asks whether the last cylinder whose index of performance was stored was the last cylinder in the firing order. If it was not, the sub-routine returns to begin the data collection and index of performance calculation process for the next cylinder. If the last cylinder whose index of performance was calculated was the last cylinder in the firing order, a counter OPCNT is incremented. In the next decision block, OPCNT is compared to OPCYC. If OPCNT does not equal OPCYC, the program returns to receive data relative to the next cylinder's index of performance. If OPCNT equals OPCYC, the program executes the closed-loop control sub-routine illustrated in FIG. 16 and at FIGS. 17e–17g.

Returning now to the decision block in FIG. 17c in which EMGCNT is compared to EMGLIM, if EMGCNT is less than EMGLIM, the index of performance of the cylinder is stored and its absolute value added to the sum of the absolute magnitudes of the indices of performance (FIG. 17d). The program next returns to the portion of the index of performance sub-routine beginning with the CYLINDER=6 decision block as before.

Returning now to the comparison of the index of performance against RUFEMG in FIG. 17c, if the index of performance is greater than RUFEMG, EMGCNT is set to 0, and the index of performance of the cylinder is stored and its absolute value added to the sum of the absolute magnitudes of the indices of performance. The index of performance sub-routine then goes into the CYLINDER=6 portion of the index of performance sub-routine as before.

Figure 17E:
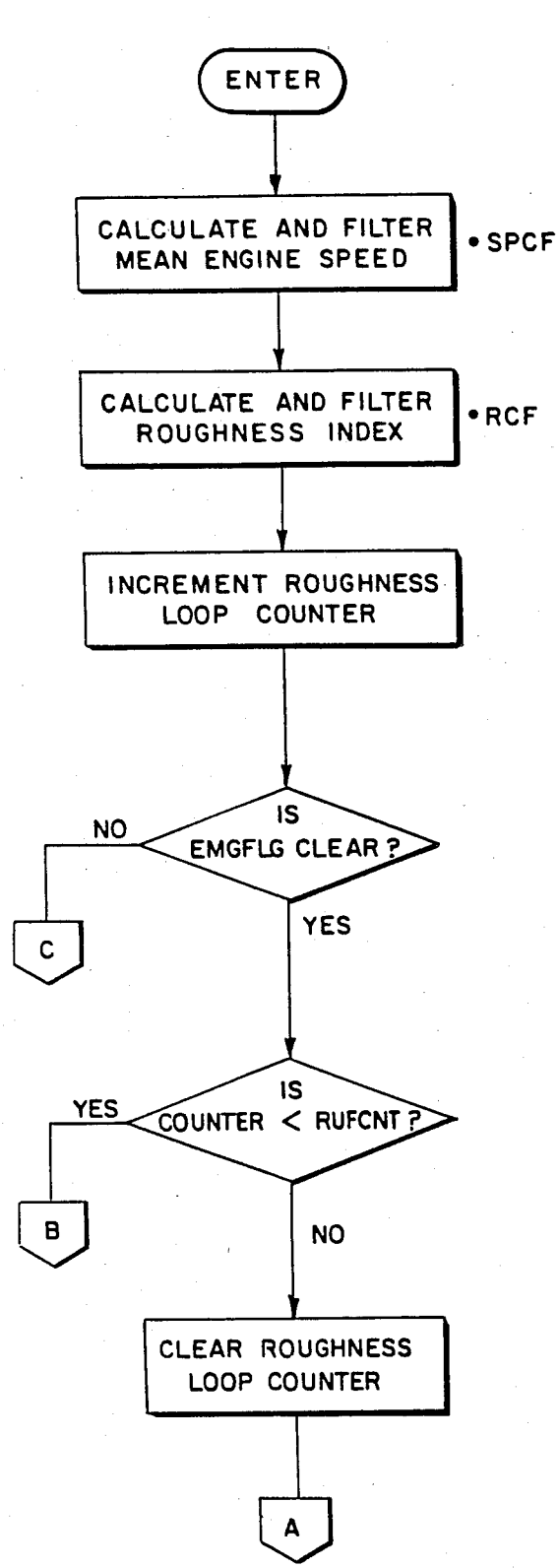
Figure 17F:
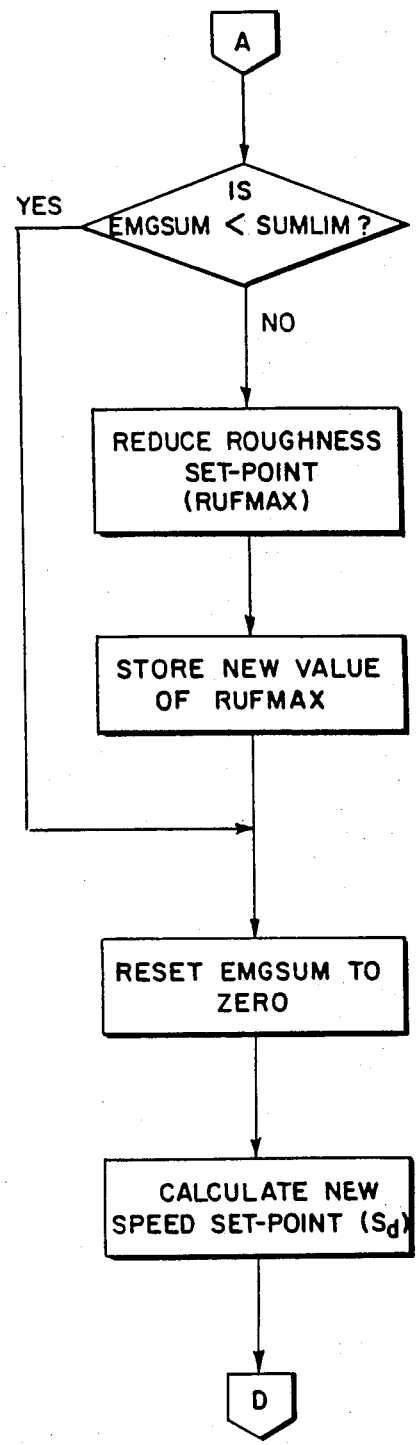
Figure 17G:
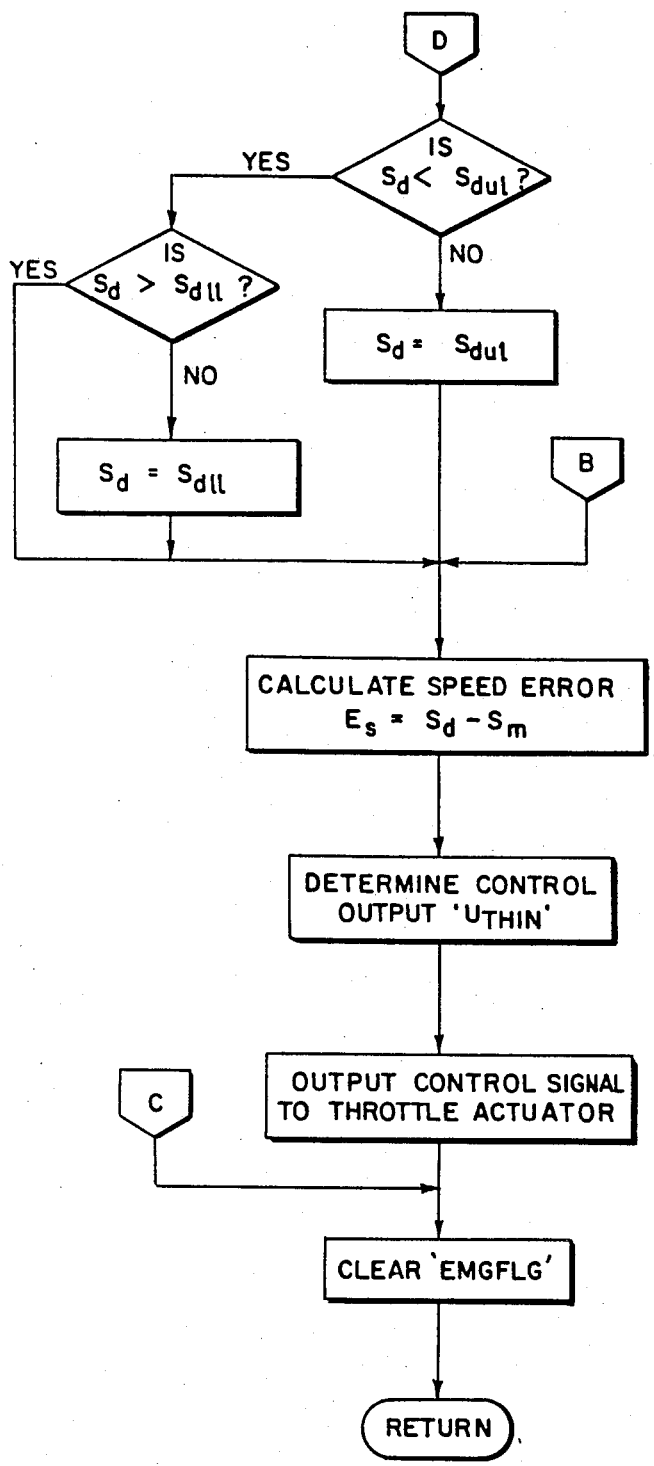

The closed-loop control program routine is illustrated in FIG. 16 and in detail in FIGS. 17e, 17f, and 17g. The program enters this routine and calculates and filters, in order, mean speed and roughness index. The mean speed calculation and filtering sub-routine SPCF is used to calculate and filter mean engine speed. The roughness index calculation and filtering sub-routine RCF is used to calculate and filter the roughness index. A roughness loop counter is then incremented. If EMGFLG, an emergency flag, is clear, the program then compares the count in this COUNTER to RUFCNT.

If EMGFLG is clear and COUNTER is less than RUFCNT, the program goes to FIG. 17g to calculate the speed error $E_s$ which equals the idle speed set-point $S_d$ minus the filtered engine mean speed $S_m$. Next, the program determines the control output $u_{THIN}$, the control output to the throttle actuator. This control output is the number of stepper motor control steps that the throttle actuator control is commanded to move. The control signal is next output to the throttle actuator. The emergency flag EMGFLG is then cleared and the system returns to the control of the index of performance sub-routine (IPSUB).

If COUNTER is not less than RUFCNT, the counter is cleared. Referring now particularly to FIG. 17f, the closed-loop control program sub-routine continues with the decision block, IS EMGSUM<SUMLIM If the answer is no, the roughness set point $R_d$ (FIG. 15), or RUFMAX (FIG. 17f), is reduced. The new value of RUFMAX is then stored. If EMGSUM is less than SUMLIM, or after the new value of RUFMAX is stored, EMGSUM is reset to 0. Then, the new speed set-point $S_d$ is calculated. Referring to FIG. 17g, the decision is made whether $S_d$ is less than $S_{dul}$. $S_{dul}$ is the idle speed set-point upper limit. This is the highest admissible idle speed set-point. If $S_d$ is not less than $S_{dul}$, then $S_d$ is set equal to $S_{dul}$. The program then calculates the speed error, $E_s$, which is set equal to $S_d-S_m$. Next, the program determines the control output $u_{THIN}$, the control output to the throttle actuator. The control signal is next output to the throttle actuator. The emergency flag EMGFLG is then cleared, and the system returns to the control of the index of performance sub-routine.

If $S_d$ is less than $S_{dul}$, the program goes to the decision block, $S_d > S_{dll}$ $S_{dll}$ is the idle speed set-point lower limit. This is the lowest admissible idle speed set-point. If $S_d$ is greater than $S_{dll}$, the program proceeds to a calculation of the speed error $E_s$, and continues in the manner previously described. If $S_d$ is not greater than $S_{dll}$, then $S_d$ is set equal to $S_{dll}$. The program then proceeds to a calculation of the speed error $E_s$ and continues in the manner described above.

Returning to FIG. 17e, if the emergency flag, EMGFLG, is not clear, the program clears EMGFLG, as illustrated in FIG. 17g and then returns to the index of performance sub-routine as illustrated in FIG. 16.

Figure 17H:
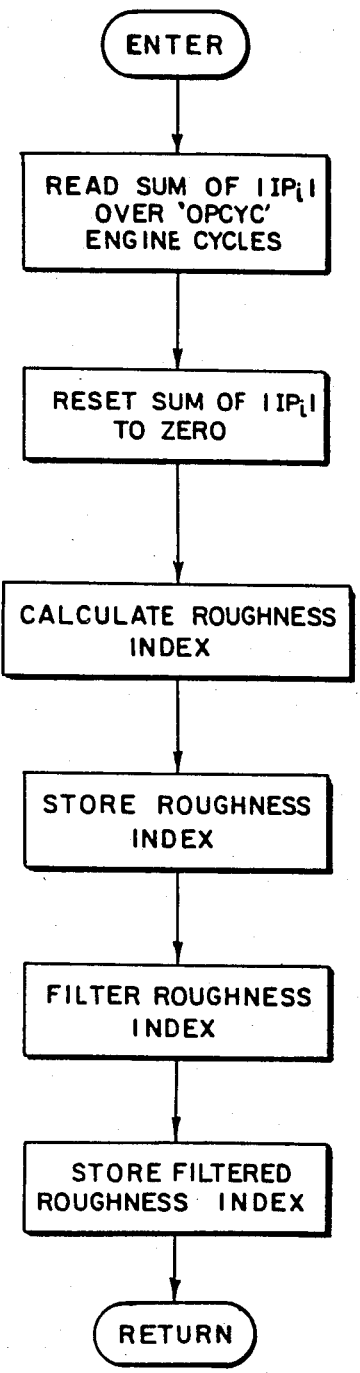

The roughness calculation and filter sub-routine (RCF) is illustrated in FIG. 17h. In this sub-routine, the sum of the absolute magnitudes of the indices of performance is obtained over the speed loop update interval OPCYC. Next, the sum of the absolute magnitudes of the indices of performance is reset to 0, and the roughness index R is calculated as discussed previously. The roughness index is stored, filtered, and the filtered roughness index is stored, and the program returns from the RCF sub-routine to CLCP sub-routine (FIG. 16)

Figures 17I, 17J:
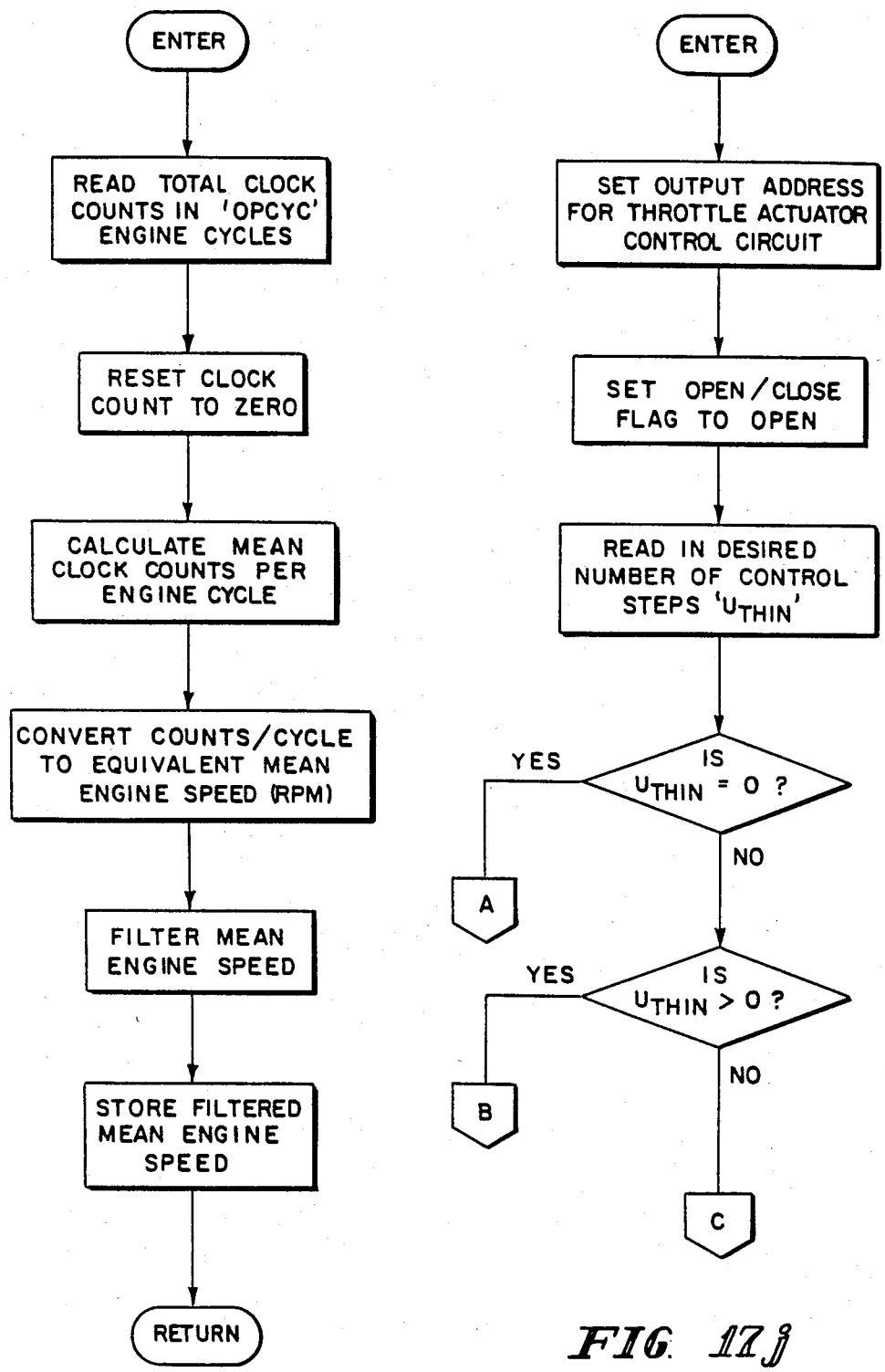

The mean engine speed calculation and filtering sub-routine SPCF is illustrated in FIG. 17i. In this sub-routine, the total number of clock counts in the OPCYC engine cycles, or OPCYC speed-loop update interval, are read, and the OPCYC clock count is reset to 0. The mean number of clock counts per engine cycle is then calculated. This sub-routine then converts the clock counts per cycle to equivalent mean engine speed (rpm). This mean engine speed is then filtered and stored, and the program returns from the SPCF sub-routine to the CLCP sub-routine (FIG. 16).

The throttle actuator control sub-routine TAC is illustrated in FIGS. 17j–17l. In this sub-routine, the output address for the throttle actuator control circuit is first set. Then, an open throttle/close throttle flag is set to open. The sub-routine then reads in a desired number of control steps, $u_{THIN}$. This is the control output to the throttle actuator, or the number of stepper motor control steps that the throttle actuator control is commanded to move. In the first decision block in this sub-routine, $u_{THIN}$ is compared to 0. As illustrated in FIG. 17l, if $u_{THIN}$ equals 0, the number of control steps sent to the throttle actuator control is stored and the program returns from the TAC sub-routine to the CLCP sub-routine. If $u_{THIN}$ does not equal 0, the TAC sub-routine reaches the next decision block, $u_{THIN} > 0$ If $u_{THIN}$ is greater than 0, as best illustrated in FIG. 17k, the throttle actuator enable line is strobed high. An open throttle/close throttle signal is sent to the throttle actuator control. In the next decision block, the absolute magnitude of $u_{THIN}$ is compared to $u_{THMAX}$, the maximum allowable throttle command. If the absolute magnitude of $u_{THIN}$ is not less than $u_{THMAX}$, then $u_{THIN}$ is set equal to $u_{THMAX}$. If the absolute magnitude of $u_{THIN}$ is less than $u_{THMAX}$, this sub-routine continues as illustrated in FIG. 17l. The control step output to the throttle actuator control circuit is sent. The throttle actuator control enable line is strobed low to initiate throttle motion. The number of control steps sent to the throttle actuator control is stored, and the program returns from the TAC sub-routine to CLCP sub-routine.

Returning to FIG. 17j, if $u_{THIN}$ is not greater than 0, the open throttle/close throttle flag is reset to close (FIG. 17k). Then the absolute magnitude of $u_{THIN}$ is calculated, and the throttle actuator enable line is strobed high. An open throttle/close throttle signal is sent to the throttle actuator control. Then the sub-routine continues with the comparison of the absolute magnitude of $u_{THIN}$ to $u_{THMAX}$ and the remainder of the TAC sub-routine as previously discussed.

| LIST OF VARIABLES FOR FIGS. 16, 17a-17l | |
|---|---|
| $E_s$ | Speed error. Speed set-point minus filtered engine speed. |
| EMGCNT | Emergency counter. Number of successive cylinders in the firing order with an IP algebraically less than RUFEMG. |
| EMGFLG | Emergency flag. Flag is set to $FFFF_{16}$ if emergency throttle action is initiated in IPSUB. if flag is set, closed-loop subroutine (CLCP) will not initiate any throttle action. Flag is reset to $0000_{16}$ at end of CLCP. |
| EMGLIM | Emergency count limit. Number of successive "bad" cylinder firings needed to initiate emergency throttle action. |
| EMGSUM | Cumulative emergency counter. Number of emergency actions that have been initiated during the past roughness loop update interval. |
| EMGTH | Emergency throttle movement. Number of stepper motor control steps that the throttle actuator is commanded to open in an emergency. |
| IP | Index of performance. Individual IP for one firing of one cylinder. |
| OPCYC | Speed loop update interval. The speed loop is updated once every OPCYC engine cycles. |
| RUFCNT | Roughness loop counter limit. Roughness loop is updated once for every RUFCNT*OPCYC engine cycles. |
| RUFEMG | Emergency roughness level. Large negative value. An individual cylinder IP less than RUFEMG causes the emergency counter to be incremented. |
| RUFMAX | Roughness set-point. |
| $S_d$ | Idle speed set-point. |
| $S_{dll}$ | Idle speed set-point lower limit. Lowest admissible speed set-point. |
| $S_{dul}$ | Idle speed set-point upper limit. Highest admissible speed set-point. |
| $S_m$ | Filtered mean engine speed. |
| SUMLIM | Limit of cumulative emergency count. If more than SUMLIM emergency actions are initiated during one roughness loop update interval (RUFCNT*OPCYC engine cycles) the roughness set-point is reduced. |
| UTHIN | Control output to throttle actuator. Number of stepper motor control steps that the throttle actuator control is commanded to move. |
| UTHMAX | Maximum allowable throttle command. Maximum number of control steps that the throttle actuator can be commanded to move in one direction. |

ADDITIONAL APPLICATIONS

Other control variations and strategies are possible with the system of the present invention. For example, an improved knock control scheme uses the concept of controlling the ignition timing to each cylinder independently. The usual corrective action for an engine which is knocking is to retard the ignition timing to all cylinders until the knock level is within acceptable limits. The retarded ignition timing causes a loss of power in the engine. In general, not all cylinders are simultaneously knocking. The knock detected may be due to but one of the cylinders. With the inventive control system, the specific cylinder or cylinders that are knocking are identified. Then the ignition timing to these cylinders alone is retarded, resulting in less power loss than if the ignition timing were retarded to all cylinders.

As another example, retarding the ignition timing in general results in lower emission levels. However, retarded ignition timing also causes poorer engine performance and fuel efficiency. In a technique for reaching the best compromise between these phenomena, the ignition timing is retarded selectively to the individual cylinders.

It has been shown in previous experimental work that the ignition timing can be retarded to some cylinders with very little loss of engine torque, while retarding the ignition timing to other cylinders under the same operating conditions results in considerable loss of engine power. By monitoring the combustion efficiency of each cylinder as described above, the effect of retarding the ignition timing on individual cylinders is measured. The ignition timing is then retarded by the maximum amount to each cylinder without causing an undue loss of engine operating efficiency.

Yet another application of the described control system is in the field of lean limit controls. The emission levels of all three of the exhaust components covered by government standards (CO, HC, NOx) decrease as the air/fuel mixture to the engine is made leaner. The lean burn concept of engine control makes use of this fact by driving the air/fuel mixture as lean as possible while still maintaining satisfactory engine performance. This action simultaneously results in improved fuel economy. As the air/fuel mixture is made leaner, it reaches a point (the lean limit) at which the engine begins to misfire, degrading the engine performance and increasing the levels of unburned hydrocarbons dramatically. If the mixture is made much leaner than the lean limit, the engine stalls.

The control system described herein can employ the lean burn control strategy by continually seeking the mixture ratio just richer than the lean limit. In this arrangement, the mixture ratio is continually driven leaner while the combustion efficiency measure is calculated and used to detect the onset of misfire. As the engine operating conditions change, the control system continues to seek the new lean limit.

In another application, it is known that the properties of the fuel used in an engine have a significant effect on the performance of the engine. The controls, such as ignition timing, air/fuel ratio, or fuel injection timing, for optimum operation in terms of fuel economy, emission levels, and performance are dependent on the properties of the fuel used. In the case of spark ignition engines, the control system described adjusts the ignition timing to the optimum value for the particular fuel used. For compression ignition engines, the timing of fuel injection and quantity of fuel injected are adjusted. Thus, compensation is provided for the normal variations in the properties of a given grade of fuel that occur as a result of the refining process.

The control technique described is extended directly to permit different grades of fuel to be burned in a given engine without modification to that engine. This permits the engine to be operated on a range of fuels without loss of performance. Thus, the operator of a vehicle is free to choose from, for example, unleaded gasoline or gasahol with varying alcohol contents, dependent on local availability. Independent of the fuel used, the control system adjusts the ignition timing to the optimum value.

Additionally, the combustion efficiency measure is used as a tool for on-line engine diagnostics. The combustion efficiency measure is an indication of the performance of each cylinder relative to the other cylinders. Identification of a cylinder with consistently poor performance under all operating conditions may signify, for example, that the spark plug in that cylinder is not firing (in a spark ignition engine). Similarly, in a compression ignition engine, a cylinder which shows a relative combustion efficiency measure consistently below the average may indicate a malfunctioning fuel injector.

The relative combustion efficiency measure can also be used in evaluating designs of air/fuel delivery systems for engines. For optimum operation, the air/fuel delivery system should distribute the air and fuel evenly among the cylinders. Uneven distribution of the air and fuel results in uneven torque production among the cylinders. Since the relative combustion efficiency measure is an indication of the relative torque production level of each cylinder, variations in the relative combustion efficiency measure among the cylinders are useful as a measure of the distribution.

What is claimed is:

1. An adaptive idle control system for an internal combustion engine, comprising an engine fuel distribution system, means for coupling the engine fuel distribution system to the engine's cylinders including a throttle for controlling the flow of fuel through the fuel distribution system for controlling the speed of the engine, means for sensing engine crankshaft position, a clock for generating a time base, means for obtaining a measure of slowest crankshaft speed independent of the occurrence of a top dead center position of the engine crankshaft during the power stroke of each cylinder, means for coupling the clock and the crankshaft position sensor to the means for obtaining a measure of crankshaft speed, means for calculating an index of performance for each of the various cylinders based upon the measures of slowest crankshaft speeds for the cylinders, means for coupling the performance index calculating means to the clock and the crankshaft position sensor, means for calculating engine roughness based upon the indices of performance, means for coupling the roughness calculating means to the performance index calculating means, means for comparing the roughness to a roughness set point and adjusting the throttle in response to the comparison to control the idle speed of the engine, means for coupling the comparing and adjusting means to the throttle, means for determining the roughness set point in response to the indices of performance, and means for coupling the roughness set point determining means to the performance index calculating means.

2. The system of claim 1 wherein the roughness set point determining means includes means for changing the roughness set point in response to a predetermined number of indices of performance for successive cylinders exceeding a predetermined limit.

3. The system of claim 2 wherein the limit comprises an indication of degradation of the index of performance from one cylinder to the next in excess of a predetermined limit.

4. The system of claim 2 wherein changing the roughness set point causes the comparing and adjusting means to increase the engine idle speed.

* * * * *